Dec. 9, 1969 J. J. R. P. DE BUCK ET AL 3,483,524

PROGRAMME SWITCHING SYSTEMS

Filed Dec. 7, 1966 11 Sheets-Sheet 1

| PROGRAMMES | CODE | ORIG. | ORDERS TRAIN (N.O.S.) | | | | | | | | | | | |
|---|---|---|---|---|---|---|---|---|---|---|---|---|---|---|
| | | | $A_1$ | 0 | 1 | 2 | 3 | 4 | 5 | 6 | 7 | 8 | 9 | 10 |
| CALL DETECTION | 00 | ID | DA | BR* | | | | | | | | | | |
| ORDER TO A SW. | 04 | RE | BA | OJ* | VJ | BR* | | | | | * END OF SERIES & DELAY | | | |
| ORDER TO 2 SWS. | 17 | " | " | " * | " | OJ* | VJ | BR* | | | | | | |
| CONNECTION | 02 | " | " | RI* | VCX | VJ | BR* | | | | | | | |
| CONNECTION + "04" | 11 | " | " | " * | VCJ* | " | " * | | | | | | | |
| IDENT.N OF SUBS. | 05 | " | " | IA | BR* | | | | | | | | | |
| d° + "02" (CONN. ATY) | 10 | " | " | " | RI* | VCX | VJ | BR* | | | | | | |
| CONN. ATY + "17" | 12 | " | " | " | " * | VCJ* | " | OJ* | VJ | BR* | | | | |
| do. + "11" | 13 | " | " | " | " * | VCX | " | RI* | VCJ* | VJ | BR* | | | |
| do. + "02" + "17" | 14 | " | " | " | " * | " | " | " | " * | VJ | OJ* | VJ | BR* | |
| SUBS. TEST | 01 | " | " | TA | BR* | | | | | | | | | |
| do. + "11" | 15 | " | " | " | RI* | VCJ* | VJ | BR* | | | | | | |
| do. + "14" | 16 | " | " | " | IA | RI* | VCX | VJ | RI* | VCJ* | VJ | OJ* | VJ | BR* |
| SCANNING OF P.M. | 09 | MP | EM | SPECIAL PROGRAMME REFER TO FIG. 15 | | | | | | | | | | |

ID IDENTIFICATION
RE REGULATOR-RECORDER
MP CURRENT PROGR. MEMORY
DA DETECTION OF CALLS
BA TRANSFER FROM REG.-REC.
BR " TO REG.-REC.
EM SCANNING OF MP

Fig. 5.

OJ ORDER TO A SWITCH (REFER VCJ)
VJ CHECK AFTER OJ
RI SCANNING FOR PATH & CONNECTION
VCX CHECK AFTER CONNECTION
VCJ do. & ORDER TO A SW.
IA IDENTIF.N OF SUBS. (SEEN FROM SWITCH)
TA SUBS. TEST (FREE OR OCCUPIED)

ORDER TRANSFERS

| TYPE | TRANSFER | INFORMATION |
|---|---|---|
| T.I.0 | CO → RE | SIGNAL : CHANGE IN STATE OF SYSTEM |
| T.I.1 | RE → CO | ORDER WITH IMMEDIATE ANSWER |
| T.I.2 | CO → RE | IMMEDIATE ANSWER |
| T.I.3 | RE → CO | ORDER WITH DELAYED ANSWER |
| T.I.4 | CO → RE | DELAYED ANSWER |
| T.I.5 | RE → CO | ORDER WITHOUT ANSWER |

Fig. 11.

Fig. 13. INFORMATION BLOCKS

| PROGR. | TRANSFER | T.I. | GROUP | TRANSFER | T.I. | GROUP |
|---|---|---|---|---|---|---|
| 00 | CO → RE | 0 | $I + II$ | CO → RE | 0 | $I + III$ |
| 04 | RE → CO | 3 | $I + II$ | CO → RE | 4 | $I$ |
| 17 | RE → CO | 3 | $I + II_1 + II_2$ | CO → RE | 4 | $I$ |
| 02 | RE → CO | 3 | $I + III$ | CO → RE | 4 | $I + II$ |
| OU | " | " | $I + II + III$ | " | " | $I$ |
| OU | " | " | $I + II + IV$ | " | " | $I + III$ |
| 11 | RE → CO | 3 | $I + II + III$ | CO → RE | 4 | $I$ |
| OU | " | " | $I + II + IV$ | " | " | $I + III$ |
| OU | " | " | $I + III$ | " | " | $I + II$ |
| 05 | RE → CO | 1 | $I + II$ | CO → RE | 2 | $I + III$ |
| 10 | RE → CO | 3 | $I + II_1$ | CO → RE | 4 | $I + II_2$ |
| 12 | RE → CO | 3 | $I + II_1 + III$ | CO → RE | 4 | $I + II_2$ |
| 13 | RE → CO | 3 | $I + II_1 + IV$ | CO → RE | 4 | $I + II_2 + III$ |
| 14 | RE → CO | 3 | $I + II_1 + III$ | CO → RE | 4 | $I + II_2$ |
| OU | " | " | $I + II_1 + IV$ | " | " | $I + II_2 + III$ |
| 01 | RE → CO | 1 | $I + II + III$ | CO → RE | 2 | $I$ |
| 15 | RE → CO | 3 | $I + II + III$ | CO → RE | 4 | $I$ |
| 16 | RE → CO | 3 | $I + II_1 + III$ | CO → RE | 4 | $I + II_2$ |

United States Patent Office 3,483,524
Patented Dec. 9, 1969

3,483,524
PROGRAMME SWITCHING SYSTEMS
Jean Jacques Rene Paul de Buck, Vence, and Jean Marie Trelut, Vaucresson, France, assignors to International Standard Electric Corporation
Filed Dec. 7, 1966, Ser. No. 599,894
Claims priority, application France, May 6, 1965, 16,069
Int. Cl. G11b *13/00*
U.S. Cl. 340—172.5 6 Claims

ABSTRACT OF THE DISCLOSURE

An electronic programmed control arrangement for a telephone or like switching network. Independent auxiliary electronic programmed machines are provided for controlling short basic operations. Their short programs are cut into trains, and a train of a program can be controlled while other programs are in a waiting position between two trains thereof. A replica network is used for the through-connection path selections.

Figure 1:
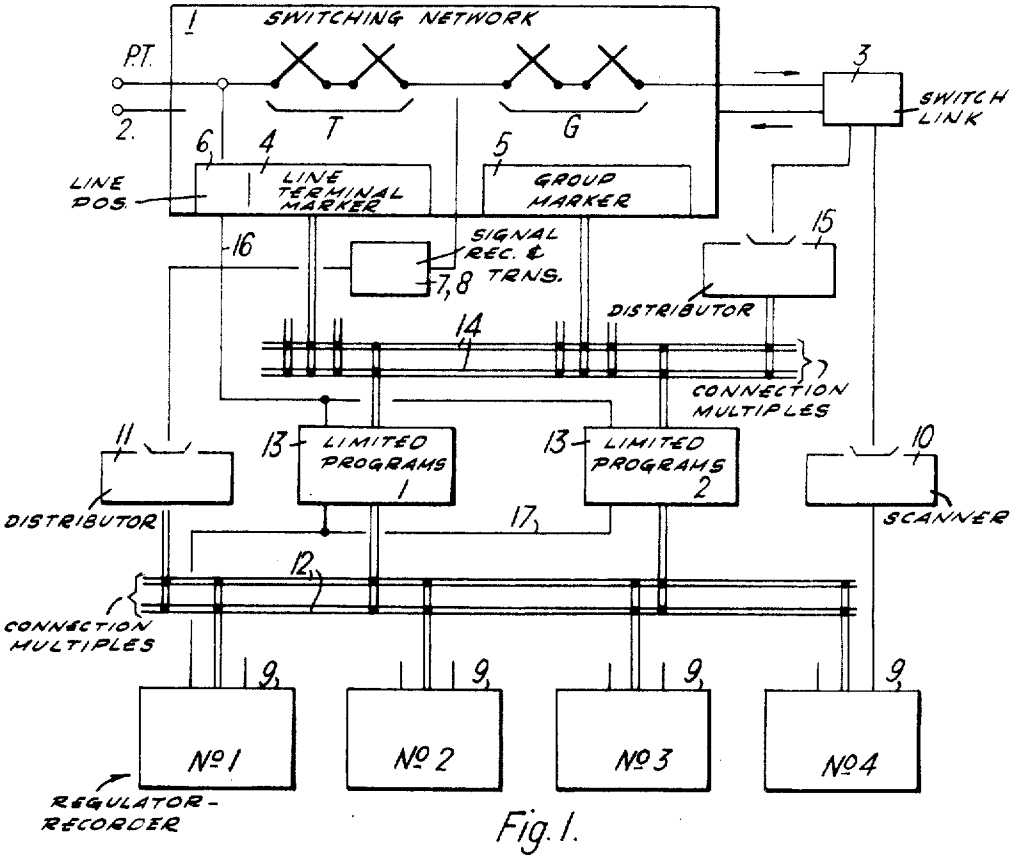

This invention relates to programme switching systems in which electronic machines similar to computers control operation of the system in accordance with a recorded programme. Special consideration is given to systems in which use is made, in the switching system of magnetic relays with magnetic rods and without back contacts. Electronic markers with wired logic are associated with switching units in this system. The terminal positions, placed on one side of the system, are connected to switches of various types equipped with ordinary or rod-equipped relays placed on the other side of the system. Scanning for connection paths is conducted in a picture network associated with the switching system. It will, however, be understood that the invention possesses features that are also applicable to systems which are not set up in this particular manner.

In certain known systems, the electronic programme machines effected general control including relatively heavy functions such as the reception and conversion of called numbers, application of tariffs and keeping subscriber accounts, etc. and relatively light, but very frequent, functions such as scanning for calls, switch control, etc. These machines must be amply equipped with every means of recording or storage, whether permanent or temporary (magnetic memory matrices, wired conversion matrices, magnetic drums, teleprinters etc. . . .). This equipment was unnecessarily engaged every time the machine was used to conduct small operations, which is not rational in a large telephone exchange where a single machine of this type is not sufficient to deal with all the traffic.

In another system of the same type, "scanners" were associated with the switches to scan, during a time division, the number received in the calls, in accordance with programmed functions. These functions have been withdrawn from the general electronic machines because the scanners themselves control this function. These scanners have thus been set up as auxiliary programme machines. However, this has not appreciably reduced the equipment of general machines with means of storage. These machines had still to be kept engaged for all the simple and frequent operations conducted in the switching system.

In accordance with the invention, provision has been made for independent auxiliary programme machines, which are placed between the general machines and the switching system. In this position, the auxiliary machines perform relatively simple operations by means of recorded programmes. Temporary memory registers store the data or information relative to these operations. The corresponding programmed functions are withdrawn from the general machines which are no longer engaged in conducting these operations. In a large exchange, this makes it possible to deal with the traffic with fewer heavily equipped machines. Several of these auxiliary machines may be necessary to satisfy the traffic and, even if a single machine could suffice, two are preferably provided for reliable service. However, the invention will be described here with reference to a single auxiliary machine whilst setting aside the questions, which could be raised if several machines were used.

Consideration will, in particular, be given to the following simple operations:

Scanning for calls (detection and identification).

Identification of lines connected with specific switches.

Testing of called lines (free or occupied)—these three types of operation being conducted in cooperation with the markers in the switching system.

Scanning for connection paths—this operation being conducted in co-operation with the picture network and, generally, completed by connection operations in co-operation with the markers.

Control and checking of switches.

In a manner, which is known in itself, the auxiliary machine covered by the invention interlocks the execution of several programmes. Programmes are cut into trains of operations, and each programme is interrupted after a chain has been executed. The machine is then available to pass over to another programme whether the latter be new or previously interrupted. A storage device is provided for storage, in a temporary memory, of current programmes until they are completed. The capacity of this storage can, for example, be 20 or 30 current programmes. After a delay inserted in each programme, the interrupted programmes are again on call for resumption. Appropriate devices are provided to set awaiting calls, which require new programmes or else which originate from current programmes. These awaiting calls are set in a position to be resumed and every time that a train of operations has been completed, to select a programme to be passed from among the awaiting calls. Execution of a train of operations is conducted without interruption.

In a system of the type under consideration, most operations are of an electronic nature, very rapid, and are measured in micro-seconds. However, the relay operations, which take place from time to time, either in the switching system or in the switches are much slower and are measured in milliseconds. Every time that the programme comes to an operation of this type, it therefore requires a relatively long period to complete it. This same period is capable, however, of covering a large number of electronic operations.

In accordance with the invention, programmes are cut up into separate trains when they attain such relay or similar operations which imply such relatively long delays. Delays of an electronic nature, which are relatively short, are, on the contrary, included in the trains of operations. It will be seen that these delays can be covering delays which will be measured, preferably, by metering of periods with an appropriately rapid frequency rate, or else waiting periods which must come to an end on reception of an answering signal.

In accordance with a characteristic of the invention, the long delays which separate the trains of operations are measured by metering periods with an appropriate slow rhythm. Special counts are provided when the various current programmes are in a delayed position with respect to the current programme register within this same memory. A special recorded programme is provided, which must be executed to the greatest extent possible, once during each period of the rhythm. The special program is used to scan this memory, to add a unit to special counts of delays and to mark the programmes in which the delay has attained the required count.

In accordance with another characteristic, a call for this special programme is automatically applied to the programme selection device. Application is made at a fixed moment during each period of the rhythm and is processed by this device as soon as a train of operations is completed, which can be during execution at any moment during a period. Other calls are offered at another fixed moment during each period, and they are also to be processed as soon as the train of current operations has been completed, but only in that part of the period which runs every time up to the moment when the special programme call is applied.

According to another characteristic, the special programme call can be applied in two different manners, either a first time in such a manner that the said device can select another call or a second time—if it has not passed the first time—in such a manner that the said device selects it on priority over the other calls. It will be noticed that the expression "to process" a call, used hereabove, concerns the selection operation in the said device. This is the operation which is limited every time between two moments in the period of the rhythm in the case of calls other than that for the special programme. The execution of a train in the programme started during this part of the period is free to continue regardless of the rhythm and division of periods. This is what can cause refusal of a special programme call at the moment when it is first offered.

In accordance with another characteristic of this invention, the current programmes which are stored in their register, and which have reached their expected delays, offer a programme resumption call, or internal wall, under the same conditions as the new calls. Preferably, however, the internal calls are selected by the priority selection device from new calls, in such a manner that a train of these programmes is conducted, to bring them to the next delay, or to complete them, prior to commencing new programmes.

The slow rhythm is, naturally, sufficiently fast for its periods to be capable of serving as a unit of measurement for the delays between the trains. Preferably, it is, however, sufficiently slow so that several trains of operations can be conducted, if necessary, in one period of this rhythm. Thus, it will be possible, if necessary, to first execute a special scanning programme, then a train of all the programmes in delay attained position (internal calls), and, finally, a first train of new, interrupted programmes, in one or two periods of this rhythm. It will be noted that the last trains of the current programmes which complete these programmes, include the deletion of these programmes from their memory register—therefore, the freeing of the fields which they occupy in the memory—and that the first trains of the new programmes, first include the registry of the information defining them in the free fields of the memory.

The relevant programmes include, in actual fact, definite operations which are almost the same and which consist, themselves, of definite series of elementary operations, each elementary operation being controlled by a distinct order delivered by the recorded programme. Each programme can be thus composed with a certain combination of these series, which characterize it, whereas each series can be executed automatically, parallel to itself, in whatever programme it is used.

According to a characteristic of the invention, the recorded programmed device contains series of definite orders, suitably indexed. For each different programme, it also contains the series of the indexes of series which form this programme, in association with the serial numbers under which these series appear in the programme. In such a manner, the recorded programme memory automatically delivers a definite series of orders when it receives the index number of the programme and the serial number of the series in this programme. This serial number is registered in the current programme memory and each series of instructions includes, at the end, and instructions which advances it by one unit with a view to the following series to be executed. In actual fact, several of these defined operations, that is to say several of these defined series of elementary operations, are placed between the two prolonged delays to form trains of operations in the programmes to be conducted. From the point of view of the delivery of orders, the registered programmes are composed, therefore, preferably, of series of automatic orders, several of which can be delivered in a train of orders.

The advantage due to the possibility of composing programmes and trains of orders with combinations of defined series of orders, the number of which is not large, rather than directly combine a very large number of elementary orders or rather than programme a large number of orders composed directly with elementary orders may be well undestood. From another point of view, the fact of composing the programmes of the auxiliary machine with series of automatic orders offers the same type of advantage as the fact of forming, in general programmes, sub-programmes given over to an independent auxiliary machine, in conformity with the invention.

According to another characteristic of the invention, the programmes are recorded in the form of a static converter, the inlets of which correspond to the orders to be delivered and the outlets of which define a large number of various elementary functions, each inlet representing an order which includes a defined group of these functions. This converter co-operates with an access and traffic device which receives on the one hand, the information which defines the orders to be delivered successively and which effects the selection of the inlets to be marked successively in the convertor in accordance with the information, and on the other hand, a traffic rate.

In accordance with a characteristic of the invention, each programme train is treated in three stages which use three different parts of the access and traffic device.

In the first stage, the access device receives, from the programme selection device, information designating the "class of call" and marks, in accordance with this information, one of the primary inlets of the convertor. In actual fact, five classes of call are provided, according to the origin of calls, viz:

calls coming from main electronic machines
calls coming from the system (which, in actual fact, come from markers)
calls coming from the current programme memory for resumption of programmes in position of attained delay
calls coming from the same memory for scanning thereof (including time metering for programmes in position of current delay)
the various calls for maintaining special programmes (errors, blocks, alarms, automatic or manual tests, etc.).

Preferably, this information is simply transmitted along separate wires running from the selection device—which marks one—to the corresponding primary entries of the convertor.

In the case of a new programme call, the converter delivers an order (or a series of orders) which causes the inscription of this programme into the current programme memory. This inscription carries, particularly on the programme index required, the identity of the calling equipment and the identity of the equipment to which the programme must be applied, for example, the identity of one of the main electronic machine and the identity of a marker, or of a switch, where it is a question of controlling operations in accordance with the programme designated by its index. In all cases, the convertor provokes inscription of the programme index and the serial number of the series to be processed in the second part of the access device. In the case of the resumption of a current programme, this information is withdrawn from the current programme memory. In the case of a new programme, the serial number "0" is automatically set for the series to be processed. The same order causes, finally, placing into action of the second part of the access device.

In the second stage, the access device, in its second part, effects selection of a secondary inlet in the convertor in accordance with the programme index and serial number of the series which have been registered in the first stage. An appropriate decoding device is provided to effect this selection. The convertor then delivers an initial order which registers, in the third part of the access device, the index of the series to be passed. This third part must receive, besides, the serial number of the following instruction in this series ("the moment" of the series) and sometimes an intervening information, such that the result of an operation, which can decide the selection of the following operation, and consequently, the index to be marked in the converter. The initial order registers an initial number, for example, "1," and fictitious information, such as "0." The same order causes, finally, placing into action of this third part of the access device.

In the third stage, the recorded programme device, conducts the series of automatic operations, the index of which was registered in the second stage. The third part of the access device effects selection to mark each time, one of the numerous tertiary inlets of the convertor, in accordance with the index and the moment of the series, and, if necessary, after the intervening information. Each order which is delivered makes the registered moment advance by one unit. Certain orders include a delay function (electronic): either one of the functions which determine the covering delays of various durations or a function which determines a delay for awaiting an answer. In the normal case, where there is no delay, the orders include a function which trips the traffic through the access device and the convertor at the rate which is supplied to the traffic device.

At the end of a series which is not the end of a train, the converter delivers an order which makes the serial number of the series advance by one unit in the second part of the access device and in the current programme memory and which places this second part into action. The convertor again delivers an order which registers the index of the new series in the third part of the access device and the programme resumes under the control of this third part.

At the end of a series which leads to a prolonged delay and which is, consequently, the end of a train, the convertor delivers an end of series order as hereabove, which includes, furthermore, functions which register the delay provided in the current programme memory and which signal the end of the train to the selection device, which then proceeds with the selection of a new programme to be passed.

At the end of the last series of a programme, the last orders, plus the functions hereabove, delete the programme from the current programme memory after having transmitted, if necessary, certain acquired information (such as the identity of an engaged component in the system, or the availability of a called line), to the equipment which had called the programme, particularly, one of the main machines.

In accordance with another characteristic of the invention, the marking traffic through the access device and the convertor is controlled, each time, in several periods in accordance with the rhythm supplied to the traffic device, for example, in four unequal periods, set up by this latter device. Delay functions, particularly delays of an electronic nature, can consist of a stop, of this periodical setting up, which causes stoppage of marking at a certain point of its passage.

Figure 2:
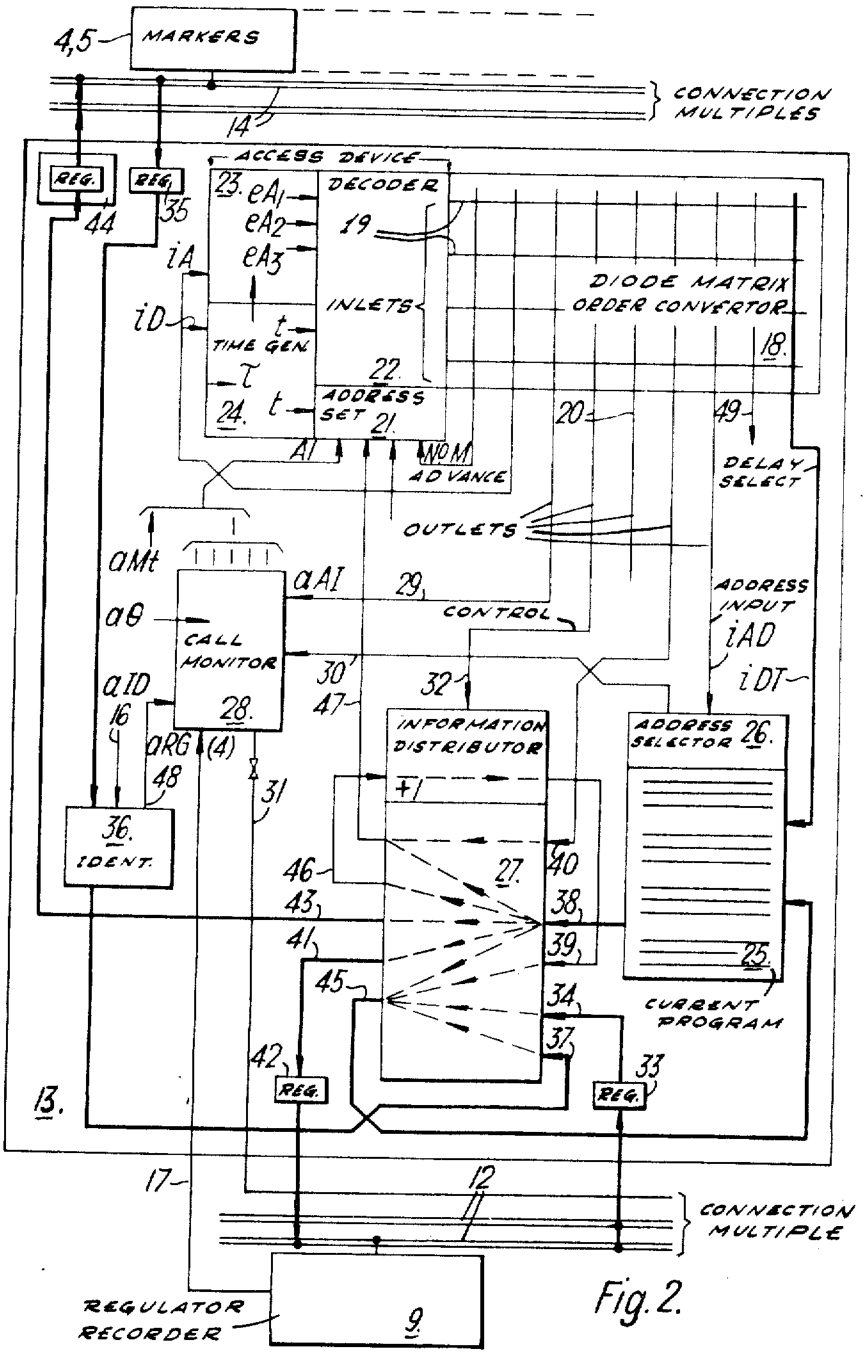
Figure 3:
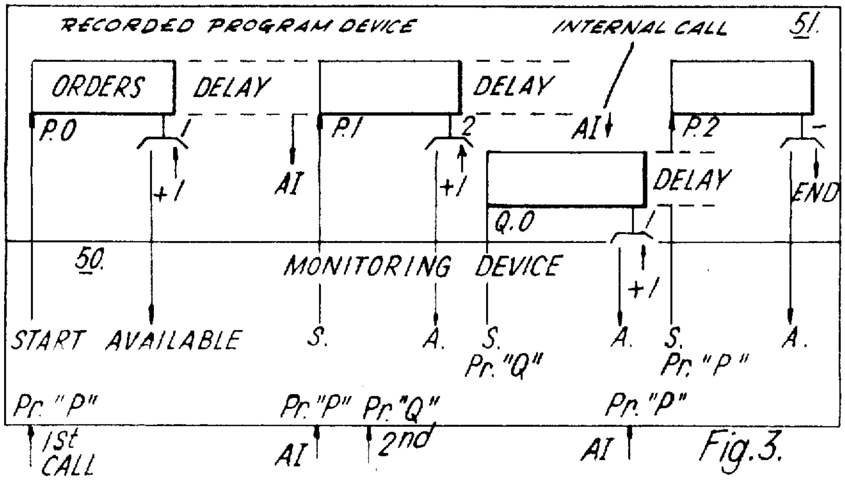
Figure 4:
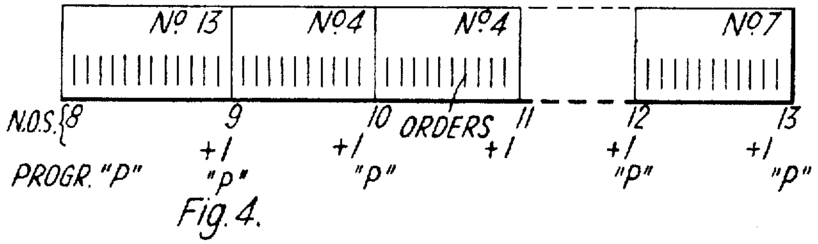
Figure 6:
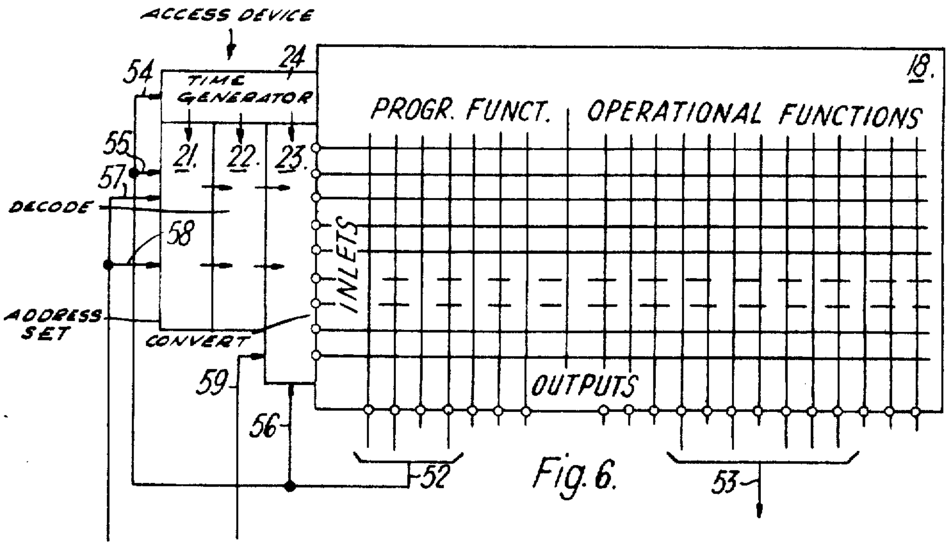
Figure 7:
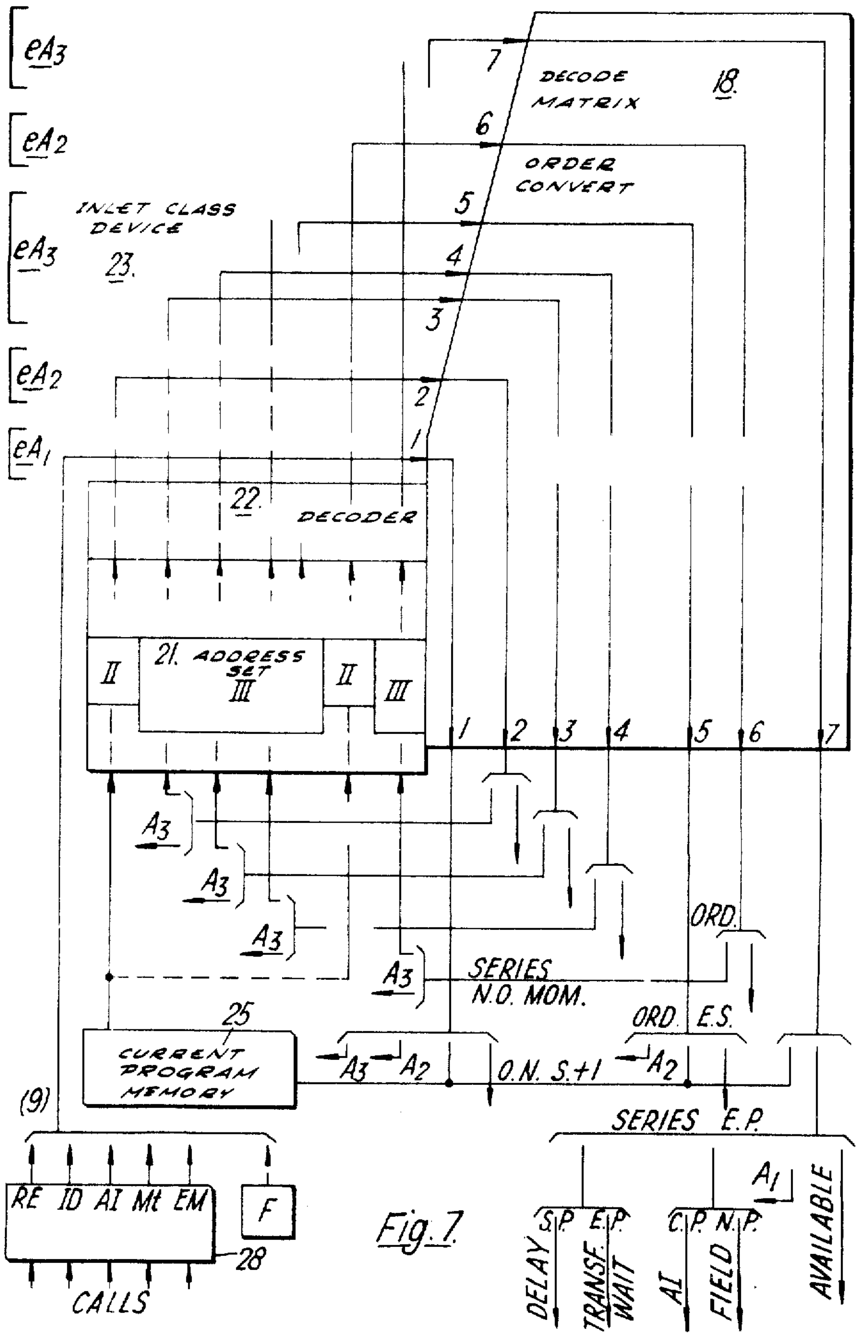
Figure 8:
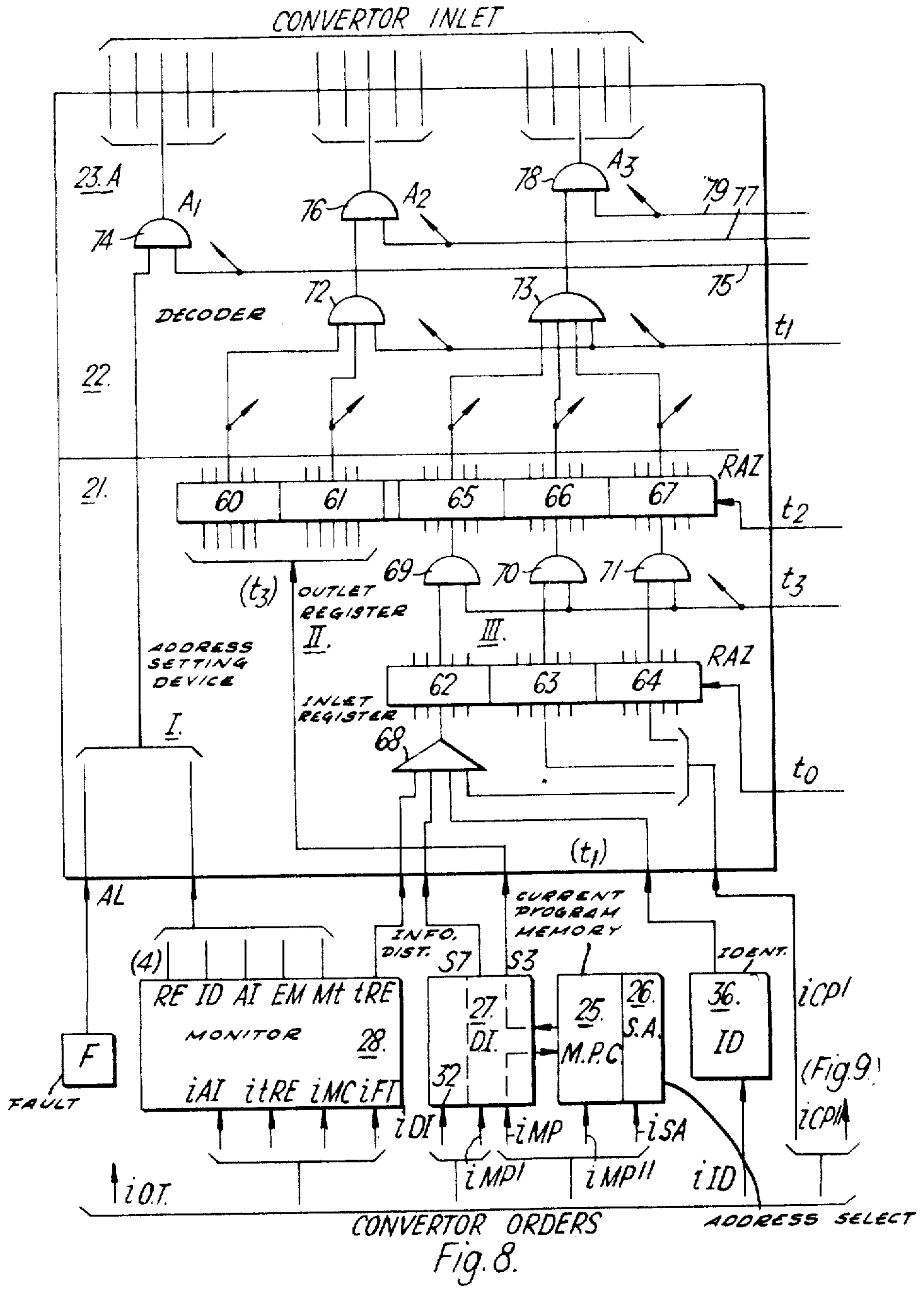
Figure 9:
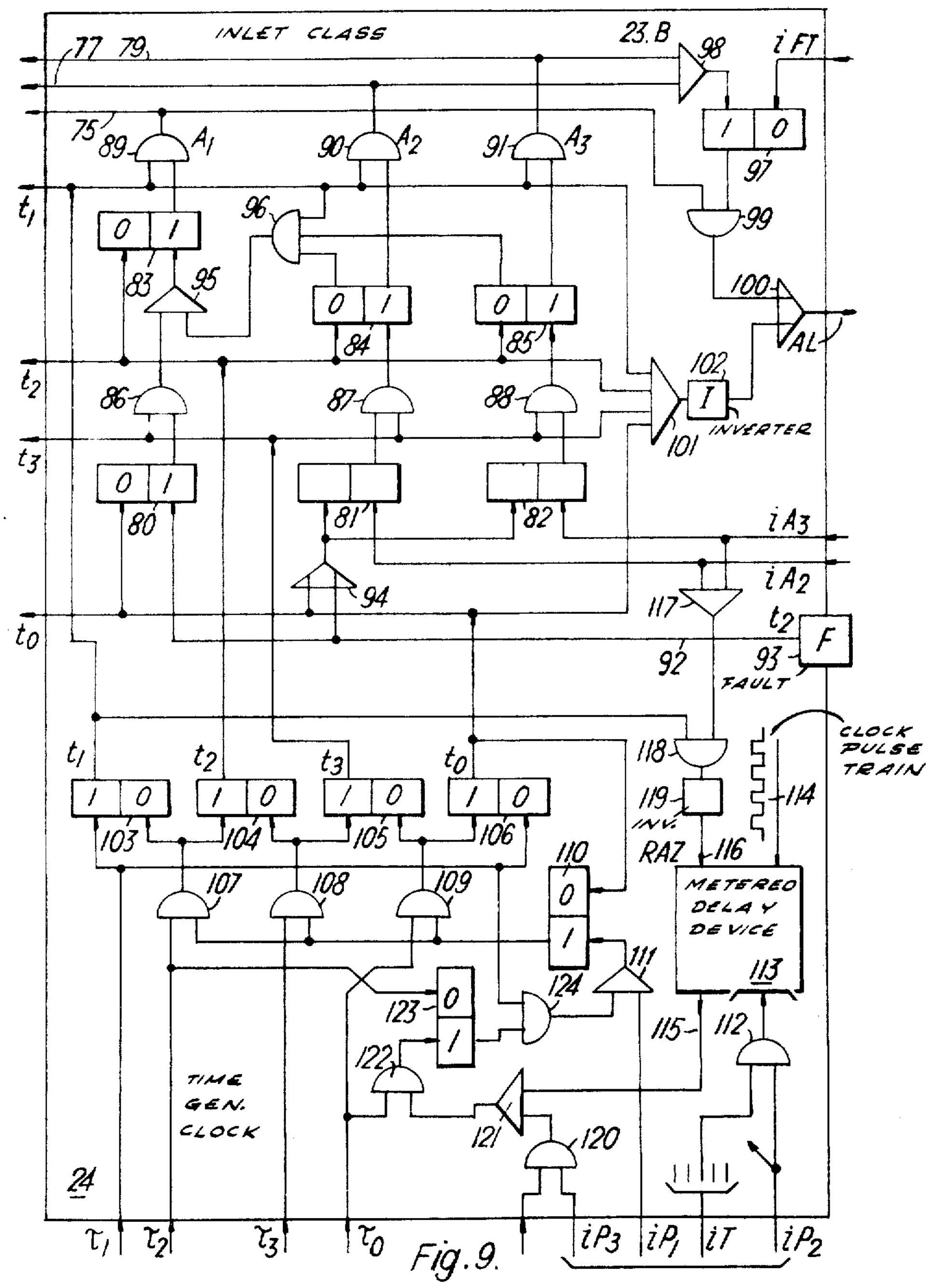
Figure 10:
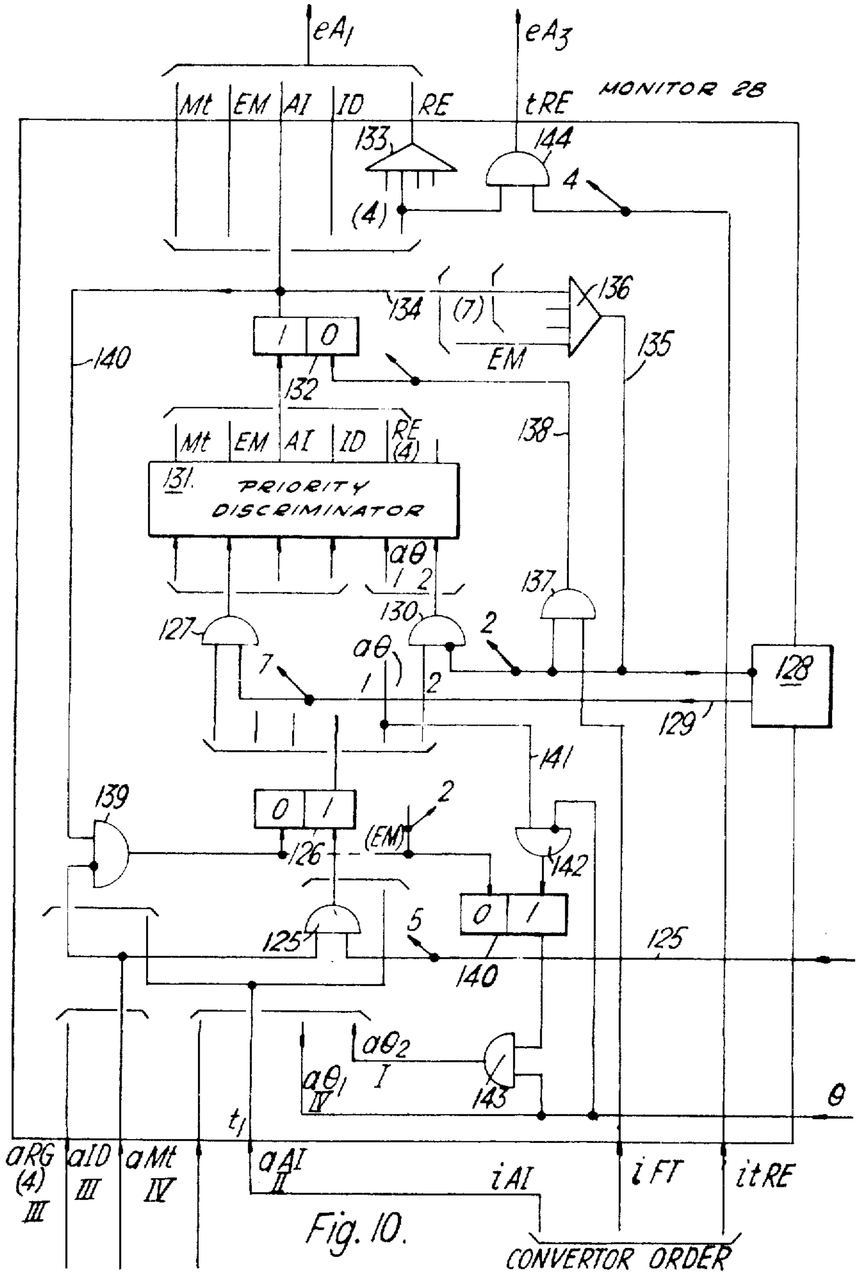
Figure 12:
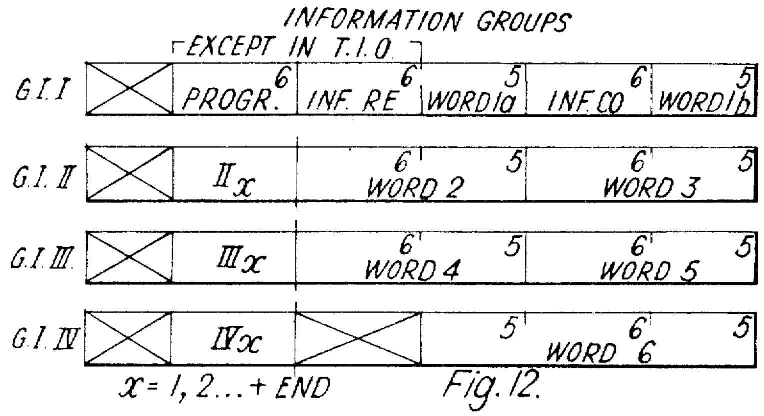
Figure 14:
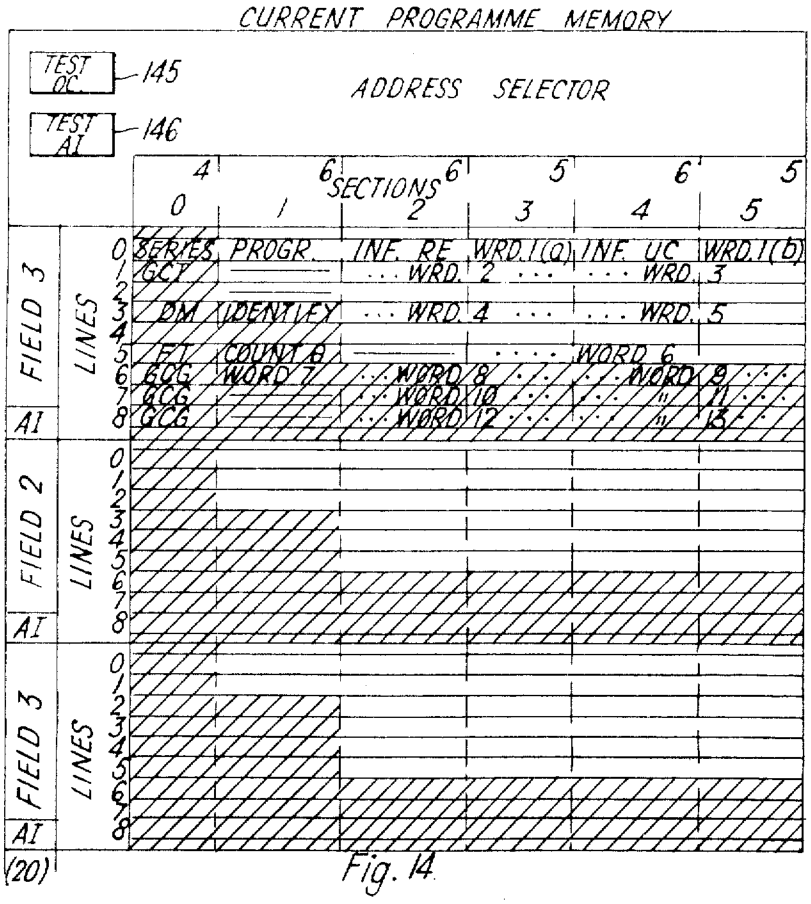
Figure 15:
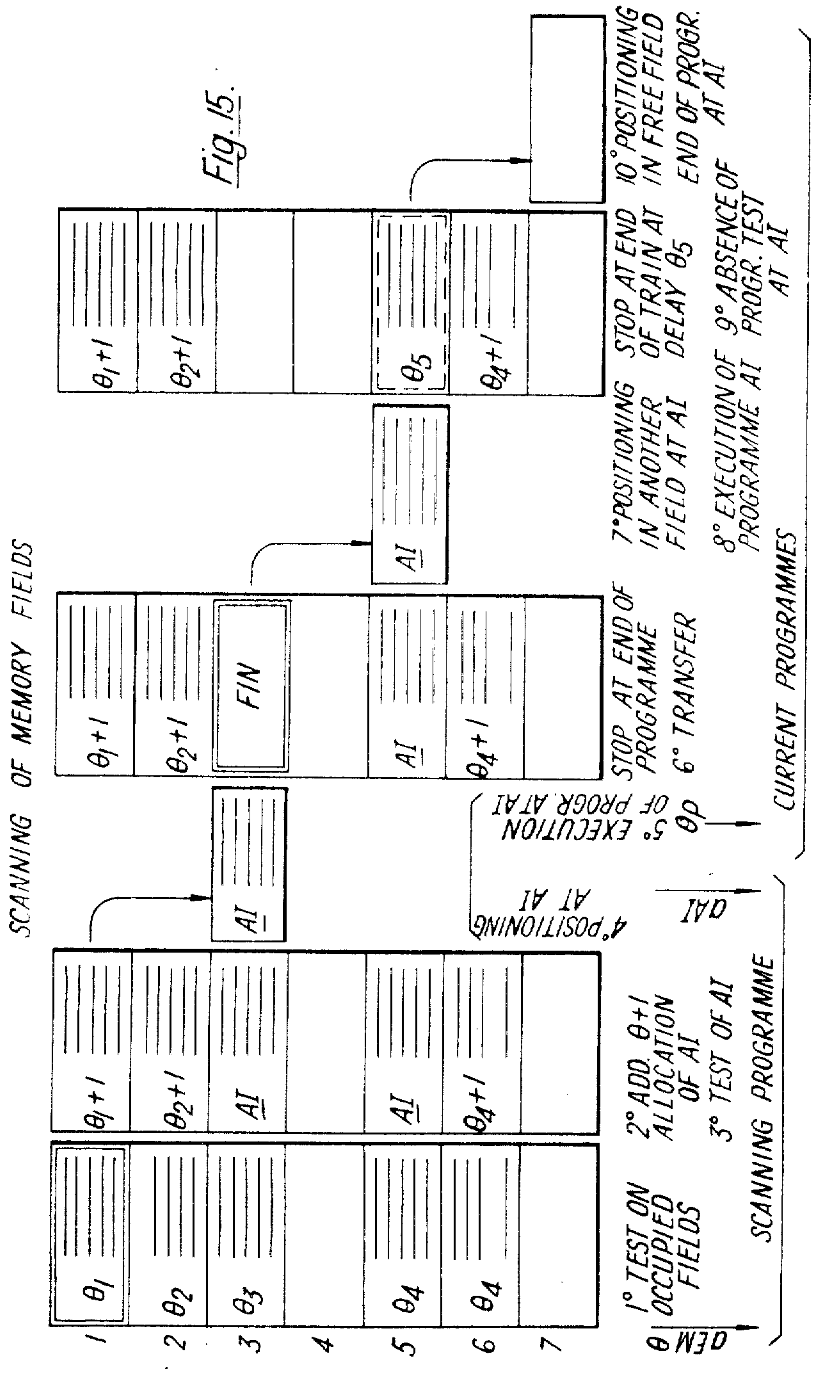

The invention will be described in a more detailed manner by referring to the attached drawings in which:

FIGURE 1 is a general diagram showing a switching system and its control equipment including recorded programme electronic machines, both main and auxiliary, FIGURE 2 is a diagram which shows an example of how an auxiliary electronic machine, in conformity with the invention, is set up, FIGURE 3 is illustrates the manner of delivering recorded programmes, FIGURE 4 shows the composition of an order train, FIGURE 5 shows the composition of several recorded programmes with a limited number of series of defined orders, FIGURE 6 shows how a recorded programme device is set up with its static convertor and its access and traffic device, FIGURE 7 shows the manner of delivering successive orders by means of this recorded programme device, in cooperation with a monitoring circuit and a current programme memory, FIGURE 8 shows, an as example, the detailed diagram of a part of the access device, which receives the information and which effects selection of convertor inlets, FIGURE 9 shows the same detailed diagram of the other part of the access device which controls the classes of inlet (primary, secondary and tertiary) and the device which sets up the traffic time, FIGURE 10 shows, similarly, the detailed diagram of the monitoring circuit which receives the programme calls and which introduces them in the recorded programme device, FIGURE 11 defines a few types of information transfers effected in the auxiliary electronic machine, FIGURE 12 illustrates the groups of information which are used in these transfers, FIGURE 13 shows the composition of blocks of information transferred in the programmes of FIGURE 5, with the groups of FIGURE 12, FIGURE 14 shows how the current programme memory is formed and FIGURE 15 illustrates the operation of this memory.

By referring to FIGURE 1, the equipment of a switching center or network includes a switching system 1, consisting of a double stage of terminal switching T and a double group switching stage G. This network is employed to give two way communication between terminal positions 2 and switch control links 3. It is assumed that the double stages are divided into switching groups to which are associated terminal markers 4 and group markers 5. Terminal markers 4 are provided with a section 6 which is associated with the terminal positions, particularly, for scanning calls and testing called lines. Receivers and transmitters 7, 8 can be connected between the double switching stages for the exchange of signals with distance exchanges.

Operation of this system is regulated, generally speaking, by regulator-recorders 9, which are recorded programme electronic machines, capable of containing numerous permanent and temporary recordings for programme requirements, conversion, the dealing with calls (called numbers, identity of circuits or equipment), and their operation in itself. In the illustrated example, four machines 9 are provided to deal with the traffic of the center. These machines reach, in particular, switches 3, by scanners 10 and the receivers and transmitters 7, 8 by distributors 11. In an installation of this nature, described in particular, on the 7th of October 1964, in the magazine "Commutation et Electronique," the regulator-recorders are connected directly to the markers in the switching system by two sets of connection multiples 12. In the installation illustrated here, operation conductors 13 are placed between regulators 9 and system 1. These operation conductors are electronic machines with recorded programmes which are more simple than the regulators and capable of only conducting limited and relatively simple operations. These are connected to regulators 9 by multiples 12, and to the system, by other multiples 14, two sets of which have also been provided for reliability. These are connected to the switches by distributor markers 15. For call and engagement requirements, when multiples 12 or 14 are not still connected, direct links 16 and 17 are provided between operation conductors 13, terminal sections 6 of markers 4, and regulators 9. Most of these machines, equipment or circuits are known as such, or are within the knowledge of a person working in the art. These are not described here. A complete description will be given, however, of the auxiliary machines or operation conductors 13, which are provided in the control equipment in conformity with the invention.

The general set up of such a machine will now be described with reference to FIGURE 2. The recorded programmes are stored in the form of a static convertor 18 set up as a grid of horizontal and vertical multiples suitably connected by means of diodes (not shown). An inlet series 19, one inlet per order to be delivered, is connected to the horizontal multiples. Very numerous outlets 20, each of which controls an elementary function, are connected to the vertical multiples. By means of the coupling diodes, which are suitably placed, each inlet reaches a group of outlets to deliver an order composed of a group of functions. Of course, the same functions can form part of different orders.

The information which, each time, defines an order to be delivered, is set, for example, in codes 2/5, 3/6, etc., in the setting section 21 of an access device associated to the convertor. The setting section 21 is followed by a decoding section 22 of the same device, where selection of an inlet is effected each time after the set informations. Of course, each different order must be defined by informations, in which at least one item of information is different. In the course of an automatic series, the item which changes one order to the next is the serial number of the moment in this series which is delivered each time by the convertor as one of the functions of the preceding order (wire number M on the drawing).

A third section 23 of the access device checks the inlet classes $eA_1$, $eA_2$, $eA_3$ in accordance with functions *i*A also delivered by the convertor. The access device is associated with a time generator 24 which assures passage of a marking through the access device and the convertor, at a rhythm taken from a suitable time base. This rhythm can be, either kept up or suspended for various delays in accordance with functions *i*D delivered by the convertor. Prolonged delays, such as the delays with cover the operation of relays in the switching system, cut the programmes into separate trains of orders, are generally much shorter than these delays. At the end of each train, it is possible to pass trains which belong to other programmes and to resume the interrupted programme when it has attained the required delay.

All necessary data relative to current programmes are stored in a current programme memory 25, which can be a ferrite memory device associated with an address selector 26. This is a rapid access device, which is well-known in itself and which can be of scanning-deletion and reregistration type, associated with reading and registration registers. The address selector can receive orders as to the addresses of information to be processed, by address function *i*AD delivered by the convertor. Certain stored information can, itself, come from the convertor, for example, function *i*DT which designate the delays to be attained after the trains of orders. Most of the information stored in the current programme memory is sent there by an information distributor 27, which will be further described herebelow.

The calls which arrive, either for new programmes, coming from regulator recorders, or from the switching system, or for current programmes which have attained their delays, coming from the current programme memory, are received by a monitoring circuit 28. This circuit sets the programme—or more exactly, the class of call for this programme—the train of which is in course of execution, and, after the end of each train, it selects one of the calls offered to pass a train of this programme. It thus receives, in particular, the separate calls *a*RG from the four regulator-recorders, the calls from the system (all on an inlet *a*ID), the periodical calls $a\theta$ for scanning programmes in the current programme memory which come from a time generator which is not shown, calls from the same memory for the resumption of current programmes which have attained their delays, and which come by passing through the order convertor (*a*AI), and, if necessary, maintenance calls (alarms, etc.) which are not shown. The same connection 29, coming from the convertor can bring other information to the monitoring circuit, such as that of the end of a train of orders. A connection 30 coming from address selector 26, brings the information on the state of occupation of the current programme memory, such that offering of an empty field, in this memory, to receive data relative to a new programme and the complete or almost complete state of congestion of this memory. Finally, a mutual connection 31 is shown for the case where provision has been made, for example, for two similar machines which are to work alternatively under certain conditions. This case will not be described here.

After each train of orders, the monitoring circuit selects one of the present calls and sets it by marking one of the lines of a group of outlet lines (one per class of call) (group $A_1$) which runs to the setting device 21 in the abovementioned access device. To this group of wires can be joined a maintenance call wire *a*M*t* coming from some non-illustrated device, without passing through the monitoring circuit. An example of carrying into effect this monitoring circuit will be described herebelow with reference to FIGURE 10.

Passage of most of the information is branched and partly controlled by information distributor 27 which is a device of a known type, the adaptation of which to the requirements of this invention is considered as being known to a man of the art. This distributor receives the control information by a connection 32 of the order convertor. The information which it distributes, stems, in particular, from the following:

The regulator-recorders, by passing through connection multiple 12, inlet registers 33, and a connection 34, The system, by passing through the connection multiples 14, inlet registers 35, and an identifier device 36 (which will be further mentioned herebelow) and a connection 37, The current programme memory, through a connection 38, Returning from an outlet of the distributor itself, by passing through some processing device (particularly, addition of a unit to the serial numbers of series of orders, and of delay times of programmes between two trains), through a connection 39, And, sometimes, a recorded programme memory, which can insert a few items of additional information through a direct connection 40. This will, for example, be the case for information to be introduced into a determined section of the setting device 21.

The information can be distributed, in particular, amongst the following outlets:

Connection 41, to the regulator-recorders by passing through an outlet register 42 and multiples 12, Connection 43, to the system by passing through an outlet register 44 (which is equipped with a certain type of control equipment), and multiples 14, Connection 45, to memory 25, through re-registration of the information which has been withdrawn therefrom for circulation, Connection 46, for return to inlet 39, by passing again through a processing device (addition of a unit), And connection 47 to setting device 21, particularly to set thereon the programme index and the serial number of the series to be conducted.

Identifier 36 is a device which concentrates the connections with the various markers in the incoming direction of the system. It is inserted in the main path which passes by the connection multiples—after the connection of these connection multiples—of course. It is also inserted in the auxiliary call and test path 16, to transmit the calls to the monitoring circuit through connection 48, and identified information to the distributor through connection 37. The identifier is also a device of a type known in itself, the adaptation of which to the requirements of this invention is within the scope of a man of the art.

Output 49 of the order convertor represents the connections through which various functions are delivered to the transfer components such as registers 33, 42, 35 and 44, identifier 36, etc.

The delivery of order trains belonging to called programmes is illustrated on FIGURE 3. Monitoring device 50 receives the calls from new programmes and those from current programmes (internal calls "AI"). It is assumed that the first call requests a programme "P." The monitoring device gives the start to the recorded programme device 51, for execution of the first train in this programme, by setting index "P" of the programme and serial number "0" of the train (P.0 on the drawing). At the end of this train—which is determined by this information "P" and "0"—the recorded programme device places programme "P" in delay position in the current programme memory, whilst adding a unit to the serial number of the train: 0+1=1. This signals its availability to the monitoring device. It is assumed that there are no other programme calls. When the delay is attained, the recorded programme device, transmits a signal "AI" which the monitoring device receives as a call for resumption of programme "P." The monitoring device gives the start to the recorded programme device for execution of the train which follows, serial number "1" of programme "P." It is assumed that during execution of this train, the monitoring device receives a new call for programme "Q." This call remains without action for the moment. At the end of train "P.1," the recorded programme device again places programme "P" in delay position, by adding a unit to the serial number of the train: 1+1=2. It signals its availability to the monitoring device. The latter gives it the start for train "0" of programme "Q." It is assumed that programme "P" attains the delay required after train No. 1 during execution of train No. 0 of programme "Q." A signal "AI" is delivered and applied to the monitoring device as a resumption call. At the end of train No. 0 of programme "Q," the recorded programme device places programme "Q" in delay position in the current programme memory by adding a serial number unit of the train: 0+1=1. It signals its availability to the monitoring device. It is assumed that there are no new programme calls, but the resumption call "AI" for programme "P" is in process. The monitoring device gives the start to the recorded programme device for execution of train No. 2 of programme "P," (P.2 on the drawing). It is assumed that it is the last train of programme "P." At the end of this train, the recorded programme device executes the end of programme operations (particularly, the transfer of acquired information to the regulator-distributor, which had called for the programme, and the deletion of this information in the current programme memory), and signals its availability to the monitoring circuit.

It is understood that this operation has been illustrated hereabove in a simplified and approximate manner, which should facilitate the interpretation of the particularities of the example of a set up described here in a non-limitative sense.

The composition of order trains with defined series of orders is illustrated on FIGURE 4. The train of orders shown consists of several defined series, the indexes or numbers themselves of which are "13, 4, 4 again . . . and 7." It is assumed that it is not the first train of this programme and that it starts with the 8th series of the programme. The serial numbers set for these series, "8," etc. do not designate their rank in the preceding trains. On the drawing, the serial numbers are thus "8, 9, 10, 11, 12." No. 13 is that in the series through which the train that follows will commence. The train is designated, at its start, by information "P" (programme index), and "8" (serial number of the series in the programme). The first order which will be delivered in accordance with this information will give index "13" to the series which is 8th in this programme. Then, the successive orders which compose the defined series "13" will be delivered automatically, each containing information on the moment of the series which defines the order to be delivered. At the end of the 8th series, an order effects addition of a unit to the serial number: 8+1=9. The first order of the 9th series will supply the index "4" of this series. It is assumed that series "7," the 12th in programme "P" ends with a prolonged delay; the end of this series will, therefore, be the end of the train. The last orders in this series also add a unit to the serial number of the series: 12+1=13, to register it in the current programme memory, so as to resume the programme, after this delay, at its 13th series. These orders designate the delay which will be metered in this memory. Finally, they signal the monitoring circuit that the recorded programme device is available for another call.

The method of designating the trains of a programme by serial numbers for the series in the programme, which will be the first in the train, presupposes that the number of series in each programme is fixed and does not depend on circumstances arising out of the execution of this programme: for example, a line test programme called for will consist of as many series if the line is free as when it is occupied. This condition is easy to satisfy in relatively simple and limited programmes which are entrusted to the auxiliary machine in accordance with the invention.

FIGURE 5 specifies the composition of the principal programmes. The latter are all called for by the regulator-recorders with the exception of the call detection programme called for by the system through the identifier included in the operation conductor, and the scanning programme of the current programme memory which is requested periodically by the rhythm employed to recommence scanning. It is understood that the internal calls which are transmitted in execution of these programmes every time that it is necessary to resume them after a delay do not figure on FIGURE 5, as programmes. The division in each programme into trains, determined by these delays, are shown by asterisks. It will be further noted that all the programmes end with a series "BR" which operates the transfer of information from the current programme memory to the regulator-recorder which called for the programme, or, in the case of call detection, to a regulator-recorder which is engaged by the operations conductor through seizure connector 17, FIGURES 1 and 2.

Scanning programme "09" is a special programme which will be explained herebelow with reference to FIGURE 15. Call detection programme "00" only consists of a special series "DA" followed by the final transfer series "BR." All other programmes, which are called for by the regulator-recorders, start by an initial transfer series "BA," from the regulator-recorder to the current programme memory in the operations conductor, terminating with the final series "BR" and consisting between these two transfers, of a few groups of series:

Order to a switch; series "OJ" aid "VJ" (programme 04).

Scanning for a path and connection, series "RI," "VCX" and "VJ" (programme 02). When the connection includes an order to a switch, use is made of series "VCJ"="VCX"+"OJ" (programme 11).

Identification of a subscriber (seen from a switch): series "IA" (programme 05).

Subscriber test: series "TA" (programme 01).

The other programmes are composed with series or groups of series which form the simple programmes herebelow:

Order to two switches, programme 17=pr. (programme) 04+pr. (programme) 04.

Connection at Y, programme 10=pr. 05+pr. 02.

Connection at Y and orders to two switches, programme 12=pr. 05+pr. 11+pr. 04.

Connection at Y, and single connection with order to a switch, programme 13=pr. 05+pr. 02+pr. 11.

Connection at Y, single connection and orders to two switches, programme 14=pr. 05+pr. 02+pr. 11+pr. 04.

Subscriber test and connection at Y etc. . . . (proprogramme 15=pr. 01+pr. 11.

Subscriber test and connection at Y etc. . . . (programme 14) programme 16=pr. 01+pr. 05+pr. 02+pr. 11+pr. 04.

Of course, this enumeration is not limitative. It will be noted, in particular, that this does not include the various maintenance programmes.

The set up of the recorded programme device and, in particular, that of the access device is shown on FIGURE 6. As stated hereabove, the recorded programme memory 18 is a static convertor consisting of a series of inlet multiples, a large number of outlet multiples and diodes—which are not shown—which couple each inlet to a group of outlets. Each inlet defines an order, each outlet controls a function and each order includes a combination of these functions. Certain functions assure operation of the recorded programme device itself: in each order, these compose a programme order 52. Other functions assure the operation of other equipment in the operations conductor and other functions, finally, are destined for the exterior (system control, connection with the regulator recorders, etc. . . .). All these other functions form an operative order 53.

The programme orders include traffic information 54, programme information 55, and inlet class information 56. The traffic information includes one of the following functions:

Application of the continous rhythm (for example, 6 microseconds per cycle through the access device and convertor).

Stoppage of the rhythm for a covering delay of an electronic nature (several functions designating different delays).

Stoppage of the rhythm for a waiting delay of an electronic nature (up to recepition of an answering signal).

Programme information includes:

The index code, or number itself, of the series (obtained after the programme index and the serial number of series in this programme).

The moment code, that is to say, the serial number of the order in the current series.

Additional information, or fictitious information, to fill a field in the setting device which receives at certain moments, information on the result of the operation (inlet 57).

Information of inlet class includes:

A function which designates the 2nd class, at the beginning of a series, to accede to the inlet which supplies the index, according to the programme index information and the serial number of the index contained in the second setting section.

Or a function which designates the 3rd class along the entire length of a defined series, to accede to successive order inlets according to the series index information, the moment order number and, possibly, information on intervention (or results), contained in the 3rd setting of the section.

No function designates the first inlet class, the call class inlets, since the call must mark one of these inlets before any order is delivered by the converter. The 1st inlet class is automatically placed into operation through the absence of a 2nd or 3rd class function.

The passage of information through the recorded programmes device is conducted in two main periods. During the first period, a marking passes through the setting device, in the second, it passes the decoding and inlet class devices and the converter, to return to the inlet of the setting device. Deletion at inlet and outlet of the setting device is effected in two periods which are interposed between the main periods. It will be seen, herebelow, that the second period mentioned hereabove is longer than the others, by reason of the number of electronic gates, coupling diodes and flip-flops which the marking must cross or actuate in this period.

The second section of the setting device receives information 58 relating to the programme index and the serial number of the series, originating from the current programme memory. These two items of information are transmitted in code, in synchronism with the first above mentioned period, and are directly registered at the outlet level of the setting device. These accompany second class inlet information delivered by the convertor and during the second above mentioned period. These are decoded so as to accede to one of the 2nd class inlets. The order which is delivered from this inlet includes, as has already been stated, information dealing with the series index and the serial number of the moment and 3rd class inlet information.

Finally, as already stated hereabove, the calls are applied (originating from the monitoring circuit) by separate wires 59, one for each class of call, which accede to the corresponding 1st class inlets, through the 1st section of the inlet class device, which is placed into operation in the absence of 2nd and 3rd class information. These calls are applied in the second above mentioned period, and marking immediately effects passage through the inlet class device and the converter, to supply an initial order of an initial series of orders. This initial series can include, for example, transfer of information concerning the called programme in the current information memory and setting of the programme index and the number of the series in the second section of the setting device 21.

The passage of current information in an order train is illustrated on FIGURE 7. Calls in process are set at the inlet of the monitoring circuit 28 (below on drawing). The call being executed is set at the outlet of this circuit. When the order train delivered for this call is completed, the monitoring circuit receives an end of train signal. It deletes setting of this call, admits all awaiting calls and selects one from these which it sets at its outlet for it to be applied to the recorded programme device. The choice of a call is subjected to conditions which will be described herebelow. The outlet wire which is allotted to the class of call set is marked and applies the marking to a primary inlet $eA_1$ (inlet 1 on FIGURE 7) of converter 18. An initial order appears at the outlet of the convertor. This order includes a group of functions, this group, however is shown on the drawing as a single outlet 1.

This initial order answers a call of a pre-determined class, whereas the called programme is not yet known.

This will, therefore, be the same for all calls in this class. If the call resumes a current programme, information concerning this programme is already to be found in the current programme memory 25. The initial order then includes functions which cause extraction of the index of the programme and serial number of the series in this memory and setting thereof in the 2nd section of device 21. It also includes a function $A_2$, which activates the inlets of class $eA_2$ in the inlet class device 23. The codes set in the 2nd section of device 21 are decoded in combination in device 22, and a 2nd inlet—inlet 2 of FIGURE 7—is marked on the convertor.

When the call concerns a new programme, the initial order for a call of this class must first cause transfer of information concerning the called programmes in the current programme memory. In actual fact, this transfer can consist of a series of operations and require, for this reason, a series of orders. In this case—which is not shown—the initial order contains functions which set the index of an initial series (with moment "0"), in the 3rd section of device 21. It is understood that each class of call can determine an appropriate initial series. The programme resumption calls can also determine initial series, although they do not require registration of the programme in memory 25. The codes for this initial series and moment "0" are decoded in combination, and a marking is applied to a tertiary inlet of the convertor. The initial order contains, in this case, a function $A_3$ which places the third section of the inlet class device, into service. At the end of the series, the convertor delivers an order which causes a setting of the programme index and the serial number of the series ("0" in a new programme) in the 2nd section of device 21, as well as placing into service of secondary inlets $eA_2$ in device 23. A secondary inlet (inlet 2 on FIGURE 7) is marked on the convertor as in the preceding case.

The convertor delivers, at its outlet 2 (which always represents a group of outlets), an order which contains the index of the series which must be executed, in accordance with its serial number in the required programme. This index is set in the 3rd section of device 21, at the same time as the class $eA_3$ inlets are activated by its function $A_3$. Moment "0" in this series and fictive intervention information are also set by means of appropriate functions contained in order 2. All this information is decoded in combination and marking is applied at a tertiary inlet $eA_3$ (inlet 3 on FIGURE 7). The order which appears at outlet 3 contains the same series index and the FIGURE 1 for the moment in the series. Marking is applied at tertiary inlet 4, and an order is delivered at outlet 4. This order contains the FIGURE 2 for the moment in the series, with the same series index. Passage continues in this manner.

At the end of the series, marking is applied at the inlet 5 (on FIGURE 7) and results in an end of series order at outlet 5. This order includes functions which advance the serial number of the series registered in memory 25 and set in the 2nd section of device 21 by one unit, these placing into service the 2nd class of inlets. The decoding device 22 applies marking to a secondary inlet, inlet 6 on FIGURE 7. The order which appears at outlet 6 of the convertor contains functions which set the index of the new series in the 3rd section of the setting device and which place into service the 3rd inlet class $eA_3$. The series of orders is then delivered by passing through the convertor.

At the end of the last series in the train, a marking is applied to inlet 7 of the convertor (on FIGURE 7). An end of train order appears at outlet 7. In actual fact, an end of a train could require several successive operations and the end of train order illustrated on the drawing can be, in actual fact, a series of a few final orders. This order, or this series of final orders, contains further functions which advance the serial number of the series by one unit in the current programme memory without setting it in the recording programme device. Amongst other functions, the following may be noted, illustrated on the drawing:

A P.D. function which registers the required delay after this train in the recorded programme memory.

In the case of a finished programme, functions FP which transfer the information from the current programme memory to the equipment which is to receive it, and which is, generally speaking, the general machine and which introduce a waiting time for a confirmation of reception signal.

A P.C. function which holds a class AI call if the current programme memory contains programmes in attained delay position, and which, therefore, can be resumed.

In the case where the memory does not contain programmes ready to be resumed—an N.P. function, which engages a free field in the memory, so as to register information concerning a new programme.

A function $A_1$ which activates the primary inlet in the converter (in actual fact, the absence of functions $A_2$ and $A_3$).

And, finally, a function which signals the availability of the recorded programme device to the monitoring circuit.

FIGURES 8 and 9 show details of a practical example of the access device. The setting device 21, in its 1st section, is simply crossed by calling class wires (4 separate RE wires for the four regulator recorders, one ID wire for the identifier, for use by the switching system, one wire AI for internal calls by programmes to be resumed after a delay, one wire EM for scanning of the current programme memory, one wire M*t* for maintenance calls, and one or several wires AL coming from the various fault F devices which detect errors, blocks, etc. . . .). In its 2nd section, device 21 only certains one register 60–61, in outlet register position. This register receives, from the current programme memory 25, information (coded) which gives the index of the programme and the serial number of the series in the programme. In its 4th section, device 21 contains an inlet register 62–63–64, and an outlet register 65–66–67. Sections 62 and 65 of these registers receive information for intervention purposes. This information can come from several sources, and, in particular, from the following:

The monitoring circuit 28, through a test wire *t*RE.

Over a wire $S_7$, from the information distributor 27 in which temporary memory positions are added to those of the current programme memory for certain information concerning these programmes.

Identifier 36.

The convertor itself, through one of functions CP.

These are concentrated by means of an "OR" gate 68 (in actual fact, with one gate per digital position in register 62). Sections 63 and 64 and 66 and 67, receive the index codes of the series and the moment in the series from the convertor. This latter information advances by one unit at each cycle through the convertor and the access device. The inlet register passes the information which it contains to the outlet register through "AND" gates 69, 70, 71 which are controlled in time as will be seen hereunder.

Decoding device 22 is simply crossed by calling class wires. The information set in register 60–61 is decoded by suitably combining the outlet wires of the two sections 60 and 61 on the inlets of "AND" gates, which are controlled in time. On the drawing, each gate 72, combines one outlet of section 60 and one outlet of section 61. In actual fact, if the information is coded, for example, in 2/5 or 2/6 code, which can be checked, each gate 72 will combine two outlets of section 60 and two outlets of section 61. The information set in register 65–66–67 is decoded in the same manner at "AND" gates 73 which are controlled in time in the same manner as gates 72.

Part 23.A of inlet class device can be seen on FIG. 8. These are simply "AND" gates which combine incident markings with marking of inlet class. Gates 74 of class $A_1$ receive separately, the call class wires and common marking over a wire 75 multiplied on all these gates. Gates 76 receive, separately, the outlet wires of gates 72 and a common marking of wire 77 multiplied on all these gates. Gates 78 receive, separately, the outlet wires of gates 73 and a common marking of a wire 79 multipled on all these gates.

It is understood that there are as many gates 74 as there are primary inlets in the convertor, as many gates 72 and gates 76 are secondary inlets and as many gates 73 and gates 78 as there are tertiary inlets.

The circulation cycle has four periods $t_0$, $t_1$, $t_2$, $t_3$. The primary information is supplied by permanent markings on calling class wires. The secondary and tertiary information set in the outlet registers 60–61 and 65–66–67 passes through gates 72 and 73 in the period $t_1$. During the same period, this marking crosses the converter and new tertiary information supplied by the outlets of the convertor are registered in inlet register 62–63–64. At the same time, new secondary information is built up in various circuits not shown. During period $t_2$, the outlet registers are re-set at zero. In period $t_3$, secondary information, coming, in particular, from memory 25 (outlets $S_3$) and the tertiary information coming from inlet registers 62–63–64 are registered in the outlet registers. At time $t_0$, the inlet register is re-set at zero.

FIGURE 8 also shows the main functions delivered by the convertor—refer to the bottom of FIGURE 8;

*i*O.T., orders to transfer components, such as registers 33, 35, 42 and 45 (FIGURE 2).

A series of information for the monitoring circuit 28, viz:

*i*AI, the information which forms the calls for resumption of current programmes contained in their memory (internal calls),
*it*RE, information relative to testing of regulator recorders,
*i*MC, information concerning the choice of connection multiples,
*i*FT, end of train signal.

Information intended for the information distributor 27, viz:

*i*DI, orders for the processing of information (scanning, distribution, modification, etc. . . .),
*i*MP', certain information concerning the current programmes, which are registered in temporary memory positions provided in the distributor for them to be read or tested during a series which is running more rapidly than those which are registered in the current programme memory.

Information for this memory, viz:

*i*MP, most information concerning current programmes, which are registered in this memory whilst passing through the distributor,
*i*MP'', certain information concerning current programmes, which are registered directly in memory 25,
*i*SA, orders from the address selector 26 associated with this memory.

*i*ID, information addressed directly to identifier 36.
*i*CP, one part of the information concerning the traffic in the recorded programme device, viz:

intervention information addressed to register 62,
indexes of addresses series for register 63,
serial numbers of moments, addressed to the register 64.

*i*CP'', another part of the information concerning traffic in the recorded programme device, details of which are shown in FIGURE 9, viz:

*i*$A_2$ and *i*$A_3$, information of inlet classes in this device,
*i*$P_1$, *i*$P_2$, *i*$P_3$ and *i*T (designated together as *i*D on FIGURE 2), information concerning the rhythm and delays of an electronic nature,
*i*FT, the same end of train signal.

By referring to FIGURE 9, the top half of this figure shows the part 23B of the inlet class circuit, which will set markings of classes $A_1$, $A_2$, $A_3$ on wires 75, 77, 79 (which run from part 23A, FIGURE 8). This marking is set up under the control of the same rhythm "$t$" in four periods $t_1$, $t_2$, $t_3$, $t_0$ which control the traffic in the circuits of FIGURE 8. The bottom half shows rhythm circuit 24, which sets up this rhythm "$t$" under the continual rhythm "$\tau$," also with four periods $\tau_1$, $\tau_2$, $\tau_3$, $\tau_0$. Rhythum "$\tau$" has a duration of 6 microseconds, that is to say 3/$\mu$s., for period $\tau_1$ and $^1\mu$s. for each of the three other periods. Marking of period "$\tau$" can take the form of suitably spaced pulses. Periods "$\tau$" are marked in immediate succession, making passing immediately from one wire to the following wire. When running normally, rhythm $t$ follows rhythm "$\tau$," but rhythm $t$ can be stopped, for example for delays of electronic nature or between two programme trains, whilst the rhythm "$\tau$" continues. Rhythm $t$ then stops in its period $t_1$. Consequently, one of the four wires $t$ must always be marked.

In each section ($A_1$, $A_2$, $A_3$) of circuit 23B there is an inlet flipflop 80, 81, 82, and an outlet flip-flop 83, 84, 85. Outlets "1" of the inlet flip-flops are connected to inlets "1" of the outlet flip-flops by "AND" gates 86, 87 and 88 which are simply controlled in time to open in period $t_3$. Outlets "1" of the outlet flip-flops are connected to wires 75, 77, 79 by "AND" gates 89, 90, 91 which are simply time controlled to open in the period $t_1$. It is, therefore, in the period $t_1$ that a marking is applied at the inlets of the order convertor through the inlet class gates 74, 76, 78 (FIG. 8) and that it appears on information wires, such as *i*$A_2$, *i*$A_3$, which leave the convertor outlets. It follows that, if it was necessary that marking $A_1$ be determined by an item of information assumed to be *i*$A_1$, whereas inlet gates $A_2$ and $A_3$ would be closed (since markings $A_2$ and $A_3$ should not be produced at the same time as marking $A_1$) and whereas inlet gates $A_1$ are reserved for programme calls, the delivery of this information *i*$A_1$ would raise a problem. This is why provision is being made that the hold marking $A_1$ is produced automatically when none of the two items of information *i*$A_2$ and *i*$A_3$ exist.

Inlet flip-flops 81–82, are placed in position "1" simply by wires *i*$A_2$, *i*$A_3$ which are connected to inlets "1" of these flip-flops. It has been seen that these wires can not be marked except in period $t_1$. Flip-flops 80 is placed in position "1" when there is a maintenance call to be passed in priority, for example for detecting a fault, by a wire 92 which comes from some fault device 93 and which is marked in period $t_2$. The three flip-flops 80–81–82 are re-set at zero at time $t_0$. Inlet "0" of flip-flop 80 is directly connected to wire $t_0$. Inlet "0" of flip-flops 81, 82 are connected to this wire whilst passing through an "OR" gate 94, the other inlet of which is connected to wire 92. In this manner, when there is an urgent programme to be passed, flip-flop 81 or 82, which has been placed in position "1" in period $t_1$ by information *i*$A_2$ or *i*$A_3$, is re-set at zero in the period $t_2$ by the signal which appears on wire 92. The outlet flip-flop 83 is set at "1" by passing through an "OR" gate 95, one inlet of which is connected to "AND" gate 86, to receive in period $t_3$, marking "1" of flip-flop 80, in the same manner as flip-flops 84–85, receive marking "1" from flip-flops 81 and 82. This flip-flop control is only used for urgent calls. Under normal operation, it is the other inlet of gate 95 which is used. This other inlet is connected to an "AND" gate 96, two inlets of which are connected to outlets "0" of flip-flops 84, 85, and the third, to wire $t_1$. Through this circuit, flip-flop 83 is set at "1" to automatically supply marking $A_1$ on wire 75 when flip-flops 84 and 85 are set at zero and supply neither marking $A_2$, nor marking $A_3$, on wires 77 and 79, through the absence of information *i*$A_2$ or *i*$A_3$, in the preceding period $t_1$. Flip-flops 83, 84, 85 are re-set at zero simply through connection of their inlets "0" to wire $t_2$.

It will be understood that under normal operation, flip-flop 81 or 82 is set at "1" in the period $t_1$ by a marking which leaves one of flip-flops 83, 84, 85 and which passes through a number of gates as well as diodes in the convertor (this is why this period $t_1$ is longer than the others). In the period $t_2$, the outlet flip-flop is re-set at zero. In the period $t_3$, flip-flop 84 or 85, is set at "1" through gate 87 or 88. At time $t_0$, flip-flop 81 or 82 is re-set at zero. In the period $t_1$, which follows, flip-flop 84 or 85 applies a marking of the inlet class to wire 77 or 79 through gate 90 or 91. This marking returns, through the convertor, in an item of information $iA_2$ or $iA_3$, which again places a flip-flop 81 or 82 in position "1," and so on. At the end of a train, the order delivered by the convertor does not contain information $iA_2$ or $iA_3$. It contains, however, information ($iP_1$, referred to herebelow) which still delivers a cycle of the rhythm "$t$." In period $t_1$, which follows, the rhythm stops with the two flip-flops 84 and 85 at "0." Flip-flop 83 is set at "1" by gates 96 and 95 and applies marking $A_1$ through gate 89 on wire 75 whilst awaiting a programme call. In case of urgency, the fault device (or other devices) places flip-flop 80 at "1" in the period $t_2$. At the same time, it re-sets the flip-flop 81 or 82 at zero, before this flip-flop has been able to re-set flip-flop 84 or 85 at "1" through gate 87 or 88 which only opens in the period $t_3$. In this period $t_3$, flip-flop 80 places flip-flop 83 at "1" through gate 86. At time $t_0$, flip-flop 80 is re-set at zero and in the period $t_1$ which follows, flip-flop 83 marks wire 75 through gate 89 whereas flip-flops 84 and 85 are at "0."

FIGURE 9 shows as an example, a supervision circuit associated with wires "$t$" and "A." As soon as marking $A_2$ or $A_3$ is applied to wires 77 or 79, a supervision flip-flop 97 is placed in position "1" through an "OR" gate 98, the two inlets of which are connected to these wires, and the outlet, to inlet "1" of flip-flop 97. Outlet "1" of this flip-flop is connected to an inlet of an "AND" gate 99, the other inlet of which is connected to wire 75. If marking $A_1$ appears on this wire at the same time as one of the markings $A_2$ or $A_3$, the outlet of gate 99 will actuate an alarm device (arrow AL on drawing) by passing through an "OR" gate 100. On the other hand, the four inlets of "OR" gate 101 are connected to four wires "$t$." The outlet of this gate is connected to another inlet of gate 100 by an inverter 102. If none of the four wires $t$ is marked, the inverter 102 delivers a marking which will actuate the alarm device illustrated by the arrow AL. When, at the end of a train, wire 75 must be marked again, information $i$FT re-sets flip-flop 97 at zero and gate 99 does not function—on condition that marking $A_2$ or $A_3$ does not appear at the same time as marking $A_1$. If, on the contrary, marking $A_1$ arrives as a result of an urgency signal, flip-flop 97 will not have been re-set at zero, and the alarm will function.

The rhythm device contains a closed system of four flip-flops 103, 104, 105, 106. Inlet "1" of each flip-flop is connected to inlet "0" of the preceding flip-flop. Outlets "1" give markings of the four periods $t_1$, $t_2$, $t_3$ and $t_0$. Thus, each marking "$t$" appears at the same time as the preceding marking disappears. These outlets are connected to rhythm wires "$t$" of FIGURES 8 and 9. These same wires can be connected to other devices, as, for example, to deliver an urgency signal on wire 92 in period $t_2$. Inlet "1" of flip-flop 103 is directly connected to the $\tau_1$ wire of rhythm "$\tau$." Inlet "1" of the three other flip-flops are connected to three other wires of this rhythm through "AND" gates 107, 108, 109 which are controlled by outlet "1" of a traffic flip-flop 110. As long as this flip-flop is in position "1," these gates make it possible for rhythm "$\tau$," to actuate the four flip-flops 103, 106 and rhythm "$t$" at the outlet of these flip-flops follows rhythm "$\tau$" in immediate succession on the four wires "$t$." At each time $t_0$, flip-flop 110 is re-set at zero by connection between outlet "1" of flip-flop 106 and inlet "0" of flip-flop 110. Under normal operation, continuous circulating information $iP_1$, which the convertor delivers in the period $t_1$ re-sets flip-flop 110 at "1" through "OR" gate 111 connected to inlet "1" of this flip-flop, in such a manner that gate 107 is ready to allow passage of marking of pulse $\tau_2$. However, when a delay of an electronic nature (which is included in a train of operations), is provided in the programme, information $iP_1$ is not delivered, but delay information $iP_2$ or $iP_3$ is delivered. Markings $\tau_2$, $\tau_3$, $\tau_4$, $\tau_0$ no longer reach flip-flops 104, 106, flip-flop 103 remains at "1" and wire $t_1$ remains marked during this delay as described hereabove. When a train of operations is completed, no information "$i$P" is delivered by the convertor and the effect is the same: wire $t_1$ remains marked by flip-flop 103 in position "1" whilst awaiting that the call from another programme make an order containing information $iP_1$ emerge. Rhythm "$t$" then immediately resumes. Information $iP_2$ designates a covering delay the duration of which is determined by the programme. This information is delivered at the same time as information $i$T, selected from amongst several items of information $i$T, which designate (in code) various delays. The group of wires in which the delay code is composed is connected to a group of "AND" gates 112. Wire $iP_2$ is multipled on the other inlets of these gates. The outlet of these gates is connected to a metered delay device 113, which receives, on the other hand, a regular rhythm 114 to meter the cycles of this rhythm up to a number designated by the combination of gates 112. When the designated count is attained, device 113 delivers marking at its outlet 115. Devices of this type are well known in the art and there is no need to describe how they are constituted. It is assumed that this device is started in rhythm 114 as soon as continuous marking on a zero re-setting inlet 116 is deleted. This marking is delivered by a reverse logic circuit which includes an "OR" gate 117, an "AND" gate 118 and an inverter 119. Gate 117 is connected to wires $iA_2$ and $iA_3$; it delivers outlet marking at each period $t_1$ in which information $iA_2$ or $iA_3$ is delivered by the programme. This outlet is connected to an inlet of gate 118. The other inlet of this gate is connected to outlet "1" of flip-flop 103, thereby checking period $t_1$. Gate 118 delivers outlet markings in the periods $t_1$ in the presence of information $iA_2$ or $iA_3$. Under these conditions, inverter 119 does not deliver zero re-setting marking and device 113 can be started in the rhythm 114. As soon as period $t_1$ has passed, either when running at a continuous rhythm, or after the delay metered in accordance with the code composed on gates 112, the inverter 119 delivers a marking which re-sets device 113 at zero and maintains it at this position. In actual fact, device 113 can meter several periods of rhythm 114 during each period $t_1$ when running at a continuous rhythm (when period $t_1$ lasts for 3 $\mu$s.) and be re-set at zero as soon as passage is effected to period $t_2$.

Information $iP_3$ designates a holding delay. It is applied at an inlet of an "AND" gate 120, the other inlet of which carries wire "Rep," on which the awaited signal will arrive. On reception of this signal, an end of delay signal is delivered on the outlet of gate 120. This outlet and outlet 115 of device 113, are connected to the inlets of an "OR" gate 121, the outlet of which is connected to an "AND" gate 122. This gate is simply controlled in time through connection of its other inlet to wire O. Consequently, during first period $\tau_0$, after the end of a delay ($iP_2$ or $iP_3$)—and whilst rhythm "$t$" is always stopped in its period $t_1$—gate 122 delivers an outlet signal. This signal is applied at inlet "1" of a repeating flip-flop 123, which passes to position "1." Outlet "1" of this flip-flop is connected to an "AND" gate 124 which is controlled in time, its other inlet being connected to wire $\tau_1$. Consequently, in the period $\tau_1$ which immediately follows period $\tau_0$ which has made it possible for flip-flop 123 to pass to "1," gate 124 delivers an outlet signal. The outlet of this gate is connected to the other inlet of "OR" gate 111, mentioned hereabove, through which traffic flip-flop 110 is placed in position "1." By reason of this fact, as from period $\tau_2$ which immediately follows period $\tau_1$ mentioned hereabove, flip-flop 104 is actuated by gate 107, etc. . . . In other words, the passage of rhythm "$t$" is re-established. At this moment $\tau_2$, flip-flop 123 is re-set at zero by means of a connection between its inlet "0" and wire $\tau_2$.

A practical example of the monitoring circuit 28 (FIG. 2) will now be described with regard to FIGURE 10. The essential purpose of this circuit is to pass the calls to the recorded programme device, that is to say, to receive calls when they come and to select from these, one call to introduce it into the said device under suitable conditions. The first of these conditions will, naturally, be that there be no programme being executed in this device. Another condition, which has already been mentioned, is that periodical calls from the special scanning programme of the current programme memory can be introduced at any moment whatsoever, whereas other calls, which can arrive at any moment, cannot be introduced except during part of each period of the rhythm of the said periodical calls. The selection of a call is subordinated to an order of priority which will be specified herebelow.

The calls which can arrive are the following:

Separate calls $a$RG from the four regulator-recorders, which will have 3rd priority, Calls from the system, passed through identifier $a$ID, which will also have 3rd priority, Various maintenance calls $a$MT (tests, alarms, etc. . . .) which will, in general, be of 4th priority, Internal calls $a$AI (resumption of current programmes), which are information $i$AI coming from the convertor (during a period $t_1$ of rhythm "$t$") and which will be calls of 2nd priority, The first arrival of scanning calls, $a\theta_1$, consisting of pulses at rhythm "$\theta$," and which will be of 4th priority, Possibly second arrival of same calls $a\theta_2$, consisting of the same pulses under pre-determined conditions and which will receive 1st priority.

FIGURES I, II, III, IV give the order of priority of these calls on the drawing at the bottom of FIGURE 10.

The arrival wires for all the calls are separated into two branches. The left hand branches, which are all single wires, serve for zero resetting operations which will be described herebelow. The right hand wires are single wires for calls $a$MT, $a$AI, $a\theta_1$ and $a\theta_2$; for calls $a$RG and $a$ID, these contain "AND" gates 125 which subject them, over wire 125, to a condition which is not relevant to this description. Each right hand branch, single wire or wire controlled by a gate 125 is connected to inlet "1" of a flip-flop 126 which notes the call in a durable manner until it is implemented, even when the call arrives on a short pulse. Outlets "1" of flip-flops 126 form two groups. One group includes the seven classes of ordinary calls and the other the two arrivals of special calls $a\theta$. In the ordinary group, these outlets pass through "AND" gates 127 which are controlled by device 128 by means of a wire 129 which is multipled on the other inlets of these gates. Device 128 subjects admission of calls to conditions which are not relevant to this description. In the special group, these outlets pass through "AND" gates 130 which are controlled as described herebelow. The outlets of all gates 127 and 130 admit the calls, under desired conditions, to a discriminator circuit 131 which selects one out of these calls in the order of priority indicated hereabove. It will be recalled that one of the conditions to which the calls are admitted to the discriminator circuit, is that there is no programme being conducted. The discriminator marks one of its outlets, that which is allocated to the call which it has selected. It will be noted that the calls of the special programme, which are admitted into the discriminator by the two inlets which correspond to the two arrivals of these calls (which have not the same order of priority in the discriminator), are represented by a single outlet EM of the discriminator, the special programme being the same in both cases. Each outlet wire of the discriminator is connected at inlet "1" of a setting flip-flop 132. Only the flip-flop allocated to the class of calls selected by the discriminator is set at position "1" and thus sets the selected call. The outlets of flip-flops 132 carry calling wires, the other extremity of which has been shown at the inlet of the recorded programme device, FIGURES 2, 6 (wire 59), 7 and 8. It will be noted that the four separate outlets allocated to the regulator recorders are joined together on a single calling class wire through an "OR" gate 133. Since the discriminator does not receive calls except after the end of a train of operations, when the recorded programme device is available, a call set on a flop-flop 132 signifies that a programme is being conducted.

In the monitoring circuit, the fact that a programme is being conducted is signalled by branches 134 which leave the calling wires and join on a wire 135 through an "OR" gate 136. One branch of this line directly controls, through prevention, the two gates 130 through which the special programme calls are admitted into the discriminator. Once these calls have arrived at moments $\theta$, they are admitted into the discriminators solely on condition that there is not a programme being conducted. Another branch of wire 135 controls, also through prevention, circuit 128, which adds other conditions to this condition, such as that to be found in a given part of each cycle of the rhythm "$t$"—which does not exceed the moment of the pulse. It has been seen that outlet wire 129 of circuit 128, multipled on gates 127, subjected admission of ordinary calls to all these conditions. A third branch of wire 135 is connected to an inlet of an "AND" gate 137, the other inlet of which receives end of train information $i$FT coming from the convertor. The outlet of this gate carries a wire 138 which is multipled on inlets "0" of all flip-flops 132 to re-set at zero that flip-flop which sets the call being conducted, this being the call where the information $i$FT signals the end of a train.

Arrival flip-flops 126 are re-set at zero on the double condition that the call is set on corresponding flip-flop 132 and that there has been no new call of the same class on the inlet wires of calls in the monitoring circuit. This double condition is fulfilled by means of "AND" gates 139. One inlet of each gate is connected to a branch 140 of outlet wires "1" of flip-flops 132. The other inlet is connected, through prevention, to the left hand branch of call inlet wires. The outlet of each gate 139 is connected to inlet "0" of the corresponding flip-flop 126. Thus, two gates 139 are associated with two flip-flops 126 which set the two call arrivals of the special programme, $a\theta_1$ and $a\theta_2$, but since this call is set on a single flip-flop 132, branch 140 which leaves outlet "1" of this flip-flop is multiplied on the two said gates 139. This detail is not shown on the drawing.

The first arrival of the special call is transformed, on second arrival by means of a flip-flop 140 which makes it possible to count up to 2. A branch 141 of outlet 141 of flip-flop 126 which is allocated to the first arrival $a\theta_1$, is connected to an inlet of an "AND" gate 142, the other inlet of which is connected, through prevention, to wire "$\theta$." The outlet of this gate is connected to inlet "1" of flip-flop 140. Thus, this flip-flop is set at "1" after pulse $\theta$. Outlet "1" of flip-flop 140 is connected to an "AND" gate 143, the other inlet of which is connected to the same wire "$\theta$." Thus, the following pulse $\theta$ passes through this gate and offers call $a\theta_2$ which the discriminator selects, in priority over the other calls. This presupposes that flip-flop 140 remains at "1" between the two pulses. As soon as call EM has been set on corresponding flip-flop 132, the two gates 139 re-set the two flip-flops 126 and flip-flop 140 at zero. If it has been possible to set this call before second pulse $\theta$, this pulse finds flip-flop 140 at position "0" and does not appear on wire $a\theta_2$, but only on wire $a\theta_1$, therefore, again effects a first arrival of the special call. Gates 139 only play their prevention part in the case where setting on flip-flop 132 takes place prior to end of pulse $\theta$.

FIGURE 10 also shows that the test information *it*RE which comes from the convertor (below on the drawing) returns to the recorded programme device by one of the four "AND" gates, wire *it*RE being multiplied on the inlets of these gates. The other inlets of these gates are connected to corresponding call outlets of the four flip-flops 132 which are allocated to the regulator recorders. When a programme has delivered information *it*RE, and that the call coming from one of the regulator recorders is being conducted, the corresponding gate 144 delivers programme information *t*RE which will be registered in section 62 of intervention information in the inlet register of access device 21 (for inlets of class A3) FIG. 8.

The exchanges of information which are provided between the regulator recorder and the operations conductor will now be specified. These exchanges consist of transfers between memory devices in the regulator recorders and the current programme memory in the operations conductor. The table on FIGURE 11 shows the types of transfer provided according to the origin and aspect of calls or answers. The first column gives the transfer index, the second shows the direction of transfer between its origin (RE, regulator-recorder or CO, operations conductor) and its destination (CO or RE). The third column shows the characteristics of these transfers.

FIGURE 12 shows the set constitution of information in transfer operations. This information is stored in the regulator-recorders and in the operations conductor, in various memories or memory devices, in 32 point binary lines. In the transfer operations these form blocks composed of several of these lines. Each line carries a group of items of information. In the transfer of types shown in FIG. 11, four types of such groups can be distinguished: Group I and Groups II, III, IV. Group I contains fundamental information and is used once in each transfer. The other groups are used, once or twice each, or are not used according to the type of transfer. Four points are not used in all groups, which can, therefore, transfer information on 28 binary points. In Group I, a 6 point section is allocated to the programme index, for example, in 3/6 code. Another 6 point section is allocated to special information originating from the regulator-recorder. A third 6 point contains similar information, originating from the operations conductor. Two 5 point sections are allocated together to a word "1." In Group II, a 6 point section is allocated to the index of this group in the transfer (for example, 2nd Group II). This index is special in the case where this group terminates the transfer block (for certain technical reasons, this end of the block sign is not necessary in Group I). Two 11 point sections are allocated to word "2" and to word "3." Group III is composed in the same manner as Group II and includes "word 4" and "word 5." In Group IV, a 6 point section is allocated to the inlet of this group, as in Groups II and III and a 16 point section is allocated to "word 6." One 6 point section is not used, therein, over and above the 4 point section mentioned hereabove. In the T.I.O. type transfer, where the operations conductor communicates information to a regulator-recorded without having taken charge of a programme, the programme index and special information originating from the regulator recorder are absent in Group I.

The table on FIGURE 13 shows examples of exchanges of information provided in several programmes. The first column gives the porgramme according to FIGURE 5. The line which follows each programme index gives the direction of the first transfer, the type of this transfer in accordance with FIGURE 11, the composition of the information block with the groups of FIGURE 12 and the three same conditions for transfer in the other direction. Thus, by taking the 6th line of this table, the 3rd alternative provided in programme "02" consists of a transfer from the regulator recorder to the operations conductor of two T.I.3., including Group I, a Group II and a Group IV, and a delayed answering transfer from the operations conductor to the regulator-recorder, of type T.I.4. including Group I and a Group III. Of course, these examples are not limitative.

A description will now be made of the current programme memory. FIGURE 14 shows the general arrangement of this equipment. The memory as such takes the shape of a two dimensional table (it will be understood, however, in actual fact, that it can consist of several plates assembled three dimensionally in space). This table is divided horizontally in several fields, for example, in 20 fields of 9 lines each. Each field is intended to receive information concerning a current programme and each line, one group of this information, similar to the groups shown in FIG. 12. Provision, therefore, is made, for 32 point binary lines. The uniform sections of each line divide the entire table into 6 vertical sections. An example has been shown of information in field "1" of the memory. Line "0" is allocated to Group I in FIGURE 12. The section "0" of this 4 point line, which is not used in transfer receives the serial number of the series in the programme as described hereabove. Line "1" receives a group II or III and its section "0" receives, when the programme is being conducted, the identity of the terminal switching group GCT which is used. Line "3" allocated to another transfer group. Its section "0" then receives the identity of a distributor-marker (FIG. 1) and its section "1," that of a switch. Line "5" is allocated to another transfer group. Its section "0" receives end of train information FT, when this is the case. Its section "1" receives the delay count in periods "$\theta$" between two trains. The facilitate testing of programmes which have reached the required delay, the information, coming from the recorded programme device which gives this delay, is complementary information with a fixed total. Thus, if period $\theta$ is 5 milliseconds, and if the delay must not exceed 50 milliseconds, the fixed total will be 10 units $\theta$, and if a delay of 20 milliseconds, is required in a programme, the delay information will be "6," in such a manner that the fixed total "10" will be attained at the end of 4 periods, that is to say, at the end of 20 milliseconds. Section "1" can be used during execution of a programme, by reason of the fact that the information which occupies this section during transfer, according to FIGURE 12, forms directives for registration of other information in the memory, which is not to be registered itself therein.

Lines "6, 7, 8" receive, in section "0," the identity of switching groups GCG used in the connection, and in other sections, information which will be transferred after execution of the said programme. Lines "2" and "4" are not used in the example illustrated.

The usual address selector in this type of device is associated with the memory as such. This address selector connects the usual storage and scanning registers (the shape of which is that of a memory line), to the line designated for information coming from the recorded programme. The section of a line, where new information is to be registered is designated to the information distributor (FIG. 2). Any modification to the line is effected by a well known manner, by means of scanning which deletes this line in the memory, by means of modification in the distributor and re-registration of the modified line. This concerns, in particular, the progress of meter counts in $\theta$ in programmes in holding position. The distributor scans line "5," increases count $\theta$ by one unit and again registers this line in the new count.

The address selector is provided with certain special means for the memory scanning programme mentioned hereabove. A test device 145 has been provided therein to determine if the fields are free or occupied and to place itself in a free field with a view to a new programme call. A means "AI" associated with each field is to set the programmes in holding position, which have attained the required delay (where the holding count has reached the fixed total mentioned hereabove). This setting will be used by the address selector for it to be placed on one of the fields for resumption of the programme. A parallel test device 146 is intended to determine, at once, if there are programmes in a position to be resumed. In this case, the information will be transmitted to the recorded programme device (through registration in the intervention information register), and this device will deliver internal call information AI to the monitoring circuit. Effecting these various functions, which are well known in themselves, and in the art, does not need to be described here.

FIGURE 15 illustrates the operational stages of the current programme memory. In the 1st stage shown, a programme registered in field "1" has been executed up to delay $\theta_1$. Fields "2, 3, 5, 6" contain programmes in delay position $\theta_2$, $\theta_3$, $\theta_4$, $\theta_4$. At moment $\theta$ of the operational rhythm, a call $a$EM, for scanning of the memory, arrives at the monitoring circuit. It is assumed that this call is executed and the scanning programme is executed. In this programme, the address selector first effects a general test (in parallel) of occupied fields. If this test is positive, the programme continues through addition of a unit to the count of delays. It is assumed that in fields "3" and "5," the new count attains the required delay. Position "AI" is set for these fields, in the address selector. The programme continues by a general test (in parallel) of fields in position AI. If this test is positive, the address selector places itself on one of these fields, field "3" on the drawing and delivers a signal to the recorded programme device (which is stopped after execution of the programme in field "1"). It will be understood that this signal is information which is registered in the "intervention information" section of the recorded programme access device. The order convertor delivers a call $a$AI. This call waits, with other calls if such exist, for the period of the rhythm to arrive at moment $\theta_p$ when calls (other than $\theta$ calls) are admitted in the discriminator on the monitoring circuit. At this moment, call $a$AI is selected, on priority over the others, and the programme contained in field "3" is resumed.

It is assumed that in this programme, only the last train was to be executed. This programme is, therefore, executed until it has been completed. Transfer of information takes place at the end of the programme in such a manner that field "3" is rendered free. The address selector places itself in field "5" which is also in position "AI." Call $a$AI is always set in the monitoring circuit, and the programme contained in field "5" is put into execution. On principle, the same period in the rhythm will be applied. If, however, this period has run past as in the case where this would not be the 2nd programme "AI" but the 10th or the 15th, the new pulse $\theta$ would not be accepted by the monitoring circuit, and execution of repeated programmes would continue. It would stop, if necessary, if it exceeded the following period of the rhythm, since the new pulse $\theta$ would be a second arrival of the special call, and the scanning programme would be again executed as described hereabove; test on occupied fields, addition of a unit to delay counts, etc. . . .

It is assumed, therefore, on FIGURE 15, that the programme in field "5" is placed into execution, that is to say, a train which finishes at a delay $\theta_5$. It is assumed that the memory does not contain more programmes in position "AI." The address selector effects a negative test on fields in position "AI." It delivers this information to the recorded programme device and places itself in a free field, field "7" on the drawing. The order convertor deletes call AI and the monitoring circuit is free to take another call.

In actual fact, several functions of a secondary order are provided. For example, if the last programme "AI" is at its last train, in such a manner that the address selector is in the field which has been rendered free after transfer of information concerning this programme, the address selector places itself, nevertheless, in another free field, so that a new programme does not, at once, use a field which has just been rendered free. Provision has been made for quantitative occupational tests which deliver a state of busy signal to the monitoring circuit when few free fields remain. These secondary functions do not need to be described here. The busy signal is used, in particular, in the case where the system includes two operations conductors. This signal has the calls treated by the conductor which is not full.

It goes without saying that the special description of a few practical examples has been made hereabove to make it possible to well understand the invention and that this description is not of a limitative character.

We claim:

1. A programmed switching system which is electronically controlled by main electronic control equipment containing recorded programs and information memories, said system comprising switching network means for connecting terminal positions on one side of the network to switches on the other side of the network, replica network means for scanning the connection paths in the switching network means, and independent auxiliary short program electronic control equipment connected between the main control equipment and the switching network, said auxiliary equipment comprising temporary means for the storage of data and information relative to certain simple operations.

2. The switching system of claim 1 wherein means are provided within the said auxiliary equipment for dividing the stored programs into separate sequence trains when delays are necessary between very rapid electronic operations, means for interlocking the execution of several programs with the sequence trains from different ones of said programs executed while other programs are kept in a position between two of said sequence trains, current program recording means in said auxiliary equipment for separately storing information relative to the various programs, including references defining each program and the sequence train, the duration of the delay, the time spent during the delay and the possible position of the delay attained where the program can be resumed for execution of another sequence train.

3. The system of claim 2 including means for measuring the long delays which separate the sequence trains, said measuring means comprising means for metering periods of an appropriate slow rhythm, means for transmitting signals at a moment 0 of each period for establishing a call for a special scanning program in said current program recording means, and means responsive to said transmitted signals to advance the count of special delays for programs which have attained their required delay whereby the said recalled programs thus signalled can be repeated.

4. The system of claim 3 including a monitoring circuit in the control equipment receive said programs and to select from among the received programs after the end of each train of operation, said monitoring circuit comprising means for executing the said special program at the moment 0 of each period of the said rhythm, and means for enabling the completion of other calls which are randomly established during only a part of each period.

5. The system of claim 4 wherein the recorded program device includes a static convertor, said convertor comprising a series of inlet multiples, each of which defines an order, a large number of outlet multiples which control elementary functions, crossing points such as diodes between each of said inlet multiples and a group of said outlet multiples, the functions of which form an order with each order containing a function which defines the following order, an access device for receiving information which defines each order to be delivered, including those which supply the preceding order, and means responsive to a rapid rhythm signal for enabling the information to pass through the access device and the converter.

6. The system of claim 5 wherein means are provided for dividing the programs into series of automatic orders, means responsive to each series for conducting a defined operation which can arrive in different programs and which consists of a series of elementary operations, means responsive to successive orders in the automatic series for controlling said elementary operations when each program and each separate train, consists of a certain number of these automatic series.

References Cited

UNITED STATES PATENTS

| | | | |
|---|---|---|---|
| 3,223,785 | 12/1965 | Budlong et al. | 179—18 |
| 3,312,947 | 4/1967 | Raspanti | 340—172.5 |
| 3,375,499 | 3/1968 | Ghiron et al. | 340—172.5 |

RAULFE B. ZACHE, Primary Examiner